United States Patent Office 3,759,894
Patented Sept. 18, 1973

---

3,759,894
HETEROCYCLIC DIAZO DYESTUFFS
Hans-Joerg Angliker and Richard Peter, Basel, Switzerland, assignors to Ciba-Geigy AG, Basel, Switzerland
No Drawing. Continuation-in-part of abandoned application Ser. No. 716,267, Mar. 12, 1968. This application July 30, 1970, Ser. No. 59,699
Claims priority, application Switzerland, Mar. 15, 1967, 3,756/67; Aug. 4, 1967, 11,011/67
Int. Cl. C09b 33/02, 33/12; D06p 3/52
U.S. Cl. 260—158
5 Claims

ABSTRACT OF THE DISCLOSURE

Disazo dyestuffs in which two monoazo dyestuff molecules of the general formula (I)
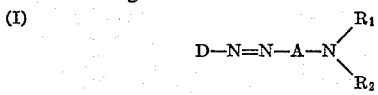

in which D represents the residue of a monocyclic or bicyclic diazo component, A represents a para-phenylene residue and $R_1$ and $R_2$ each represents an alkyl residue that may be substituted, are linked together through the residues of their coupling components by a bifunctional bridging component Z which has no dyestuff characteristics, and is one of the following formulae:

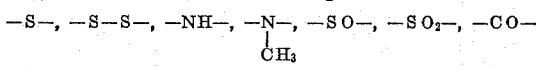

and especially a group of the formula —X′—$R_5$—X′—, in which X′ represents an oxygen atom, a sulphur atom or an —NH— group, the hydrogen atom of which may be substituted by an alkyl group having up to 4 carbon atoms, especially a methyl group, and $R_5$ represents a bifunctional aliphatic, cycloaliphatic, araliphatic, aromatic or heterocyclic residue, the carbon chain of which may be interrupted by hetero atoms, especially oxygen atoms, and which, when the two diazo components are heterocyclic ring systems and/or X′ is an oxygen atom, is preferably not a polymethylene chain and in which both of the monoazo dyestuff residues are joined to the bifunctional residue Z directly via the aromatic nucleus A.

The dyestuffs are used to dye synthetic fibers such as polyester fibers. The dyeings so obtained are very fast to light and to sublimation.

CROSS-REFERENCE TO RELATED APPLICATION

This is a continuation-in-part of application Ser. No. 716,267, filed Mar. 12, 1968, and now abandoned.

The present invention provides new and valuable disazo dyestuffs in which two monoazo dyestuff molecules of the general formula (I)
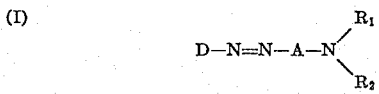

in which D represents the residue of a monocyclic or bicyclic diazo component, A represents a para-phenylene residue and $R_1$ and $R_2$ each represents an alkyl residue that may be substituted, are linked together through the residues of their coupling components by a bifunctional bridging component Z which has no dyestuff characteristics, and in which at least one of the monoazo dyestuff residues is joined to the bifunctional residue Z directly to the aromatic nucleus A, if necessary, through an alkylene bridge bound to the nucleus, and the group Z, when D represents a heterocyclic system and Z contains two oxygen atoms bound directly to the phenylene residues A or two carboxylic acid amide groups bound directly to the phenylene residues A through the nitrogen atom, also contains either an unsaturated aromatic or heterocyclic residue or a carbon chain interrupted by at least one hetero atom.

The present invention therefore provides, for example, new disazo dyestuffs of the general formula (II)

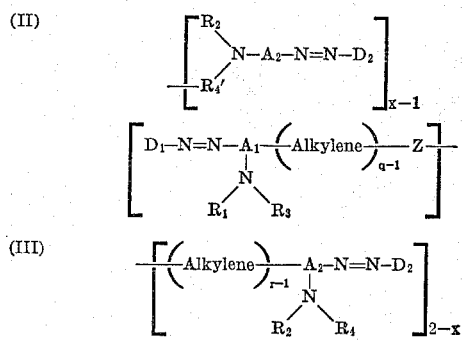

(III)

in which $R_1$, $R_2$, $R_3$ and $R_4$ each represents a hydrogen atom or preferably an alkyl group that may be substituted, and in which, when $x=2$, $R_2$ and the residue $A_2$ may be bound together to form a ring, $R_4′$ represents an alkylene group, $q$, $r$ and $x$ each represents an integer of 1 or 2, $A_1$ and $A_2$ each represents a phenylene residue in which the azo group and the group —$NR_1R_3$ or —$NR_2R_4$ are in 1,4-position to each other, $D_1$ and/or $D_2$ each represents the residue of a diazo component that may be quaternated and Z represents a bifunctional bridging component without dyestuff characteristics, and in which, when $x=1$, $q=1$ and $r=1$ and $D_1$ and $D_2$ each represents a heterocyclic system, Z contains two oxygen atoms bound directly to the aromatic residues $A_1$ and $A_2$ or two carboxylic acid amide groups bound through the nitrogen atom, the bridging component Z also contains either an unsaturated aromatic or heterocyclic residue or a carbon chain interrupted by at least one hetero atom; the invention also includes mixtures of the new disazo dyestuffs with one another, and mixtures of the new dyestuffs with other azo dyestuffs, especially monoazo dyestuffs.

The present invention thus includes disazo dyestuffs of the formula (III)
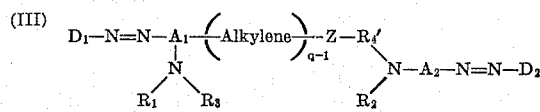

in which $D_1$, $D_2$, $A_1$, $A_2$, $R_1$, $R_2$, $R_3$, $R_4′$ and $q$ have the meanings ascribed to them in Formula II and Z represents a bifunctional bridging component without dyestuff characteristics, and also dyestuffs of the formula (IV)
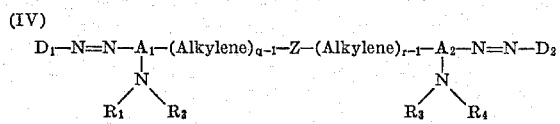

in which $D_1$, $D_2$, $R_1$, $R_2$, $R_3$, $R_4$, $A_1$, $A_2$, $q$ and $r$ have the meanings ascribed to them in Formula II and Z represents a bifunctional bridging component without dyestuff characteristics, and in which, when $q=1$ and $r=1$ and $D_1$ and $D_2$ each represents a heterocyclic system and Z contains two oxygen atoms bound directly to the aromatic residues $A_1$ and $A_2$ or two carboxylic acid amide groups bound through the nitrogen atom, the bridging component Z also contains either an unsaturated aromatic or heterocyclic residue or a carbon chain interrupted by at least one hetero atom.

The alkylene groups, which may be bound to the residues $A_1$ and $A_2$ through Z, are preferably methylene or ethylene groups. $D_1$ and $D_2$ may be identical or different.

The pairs of substituents $R_1$ and $R_3$ as well as $R_2$ and $R_4$ preferably have the same meaning, and the groups $A_1$ and $A_2$ preferably represent the residues of the formula

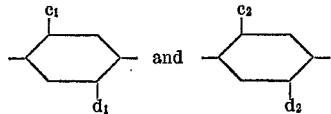

in which $c_1$, $c_2$, $d_1$ and $d_2$ each represents a hydrogen atom or a methyl, ethyl, methoxy, ethoxy, phenylthio or phenoxy residue.

The groups $c_1$ and $c_2$ are preferably bound in ortho-position to the azo group and my represent, in addition to the above-mentioned groups, a chlorine or a bromine atom, a trifluoromethyl group, an alkylsulphonyl group, preferably a methylsulphonyl group and an acylamino group that may be alkylated, preferably methylated, at the nitrogen atom, in which group the acyl residue is the residue of an organic monocarboxylic acid, the residue of an organic monosulphonic acid, for example, methane-, ethane- or para-toluene-monosulphonic acid, or the residue of a carbamic acid or a carbonic acid monoester or a monoamide, for example, a phenoxycarbonyl, methoxycarbonyl or aminocarbonyl residue.

The groups $d_1$ and $d_2$ are preferably in ortho-position to the amino group directing coupling.

When the group $R_2$ is bound to $A_2$ in ortho-position to form a ring, the products contain, for example, tetrahydroquinoline or benzomorpholine residues.

The groups $R_1$ and $R_2$ may be hydrogen atoms or low alkyl groups, that is to say, alkyl groups containing 1 to 4, preferably 2 to 4, carbon atoms, for example, methyl, ethyl, n-propyl or n-butyl groups, which may be substituted in the usual manner, for example, halogenated alkyl groups, for example, $\beta$-chloroethyl, $\beta,\beta,\beta$-trifluoroethyl and $\beta,\gamma$-dichloropropyl groups, $\beta$ - cyanoethyl groups, alkoxyalkyl groups, for example, $\beta$-ethoxyethyl or $\delta$-methoxybutyl groups, hydroxyalkyl groups, for example, $\beta$-hydroxyethyl and $\beta,\gamma$-dihydroxypropyl groups, nitroalkyl groups, for example, $\beta$-nitroethyl groups, carbalkoxy groups, for example, $\beta$-carbo-(methoxy-, ethoxy- or propoxy)ethyl groups (in which the terminal alkyl group in $\omega$-position may carry cyano, carbalkoxy, acyloxy and amino groups) and $\beta$- or $\gamma$-carbo-(methoxy- or ethoxy)-propyl groups, acylaminoalkyl groups, for example, $\beta$-(acetyl- or formyl)-aminoethyl groups, acyloxyalkyl groups, for example, $\beta$-acetyloxyethyl and $\beta,\gamma$-diacetoxypropyl groups, $\beta$-(alkyl- or aryl)-sulphonylalkyl groups, for example, $\beta$-methanesulphonylethyl, $\beta$-ethanesulphonylethyl or $\beta$-(para-chlorobenzenesulphonyl)-ethyl groups, alkyl or arylcarbamoyloxyalkyl groups, for example, $\beta$-methylcarbamyloxyethyl and $\beta$-phenylcarbamyloxyethyl groups, alkyloxy-carbonyloxyalkyl groups, for example, $\beta$-(methoxy-, ethoxy- or isopropyloxy)-carbonyloxyethyl, $\gamma$-acetamidopropyl, $\beta$-(para-nitrophenoxy)-ethyl, $\beta$-(para-hydroxyphenoxy) - ethyl, $\beta$ - ($\beta'$ - acetylethoxycarbonyl)-ethyl, $\beta$-[$\beta'$-(cyano-, hydroxy-, methoxy- or acetoxy)-ethoxycarbonyl]-ethyl, cyanoalkoxyalkyl, $\beta$-carboxyethyl, $\beta$-acetylethyl, $\gamma$-aminopropyl, $\beta$-diethylaminoethyl, $\beta$-cyanoacetoxyethyl and $\beta$-benzoyl-$\beta$-(para-alkoxy or phenoxy-benzoyl)-oxyethyl groups. These groups generally contain not more than nine carbon atoms.

Groups $R_3$, $R_4$ and $R_4'$ may contain the same substituents as groups $R_1$ and $R_2$.

The colourless bridging component Z is principally a group corresponding to one of the following formulae:

$$-S-,\ -S-S-,\ -NH-,\ -N-,\ -SO-,\ -SO_2-,\ -CO-,$$
$$\overset{|}{CH_3}$$

and especially a group of the formula $-X'-R_5-X'-$, in which $X'$ represents an oxygen atom, a sulphur atom or an $-NH-$ group, the hydrogen atom of which may be substituted by an alkyl group having up to 4 carbon atoms, especially a methyl group, and $R_5$ represents a bifunctional aliphatic, cycloaliphatic, araliphatic, aromatic or heterocyclic residue, the carbon chain of which may be interrupted by hetero atoms, especially oxygen atoms, and which, when the two diazo components are heterocyclic ring systems and/or $X'$ is an oxygen atom, is preferably not a polymethylene chain. Special preference is given to residues $R_5$ corresponding to the formulae $$-CH_2-CH_2-,\ -CH_2-CH=CH-CH_2-,$$
$$-CH_2-CH_2-X'-CH_2-CH_2$$

for example, $-CH_2-CH_2-O-CH_2-CH_2-$,

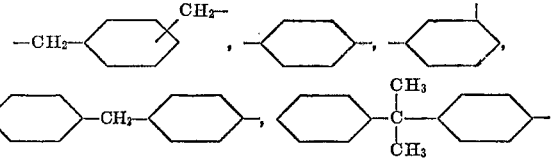

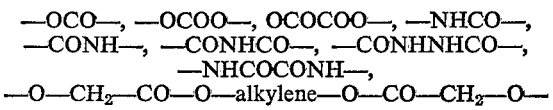

and especially groups of the following formulae which contain acyl residues:

$$-OCO-,\ -OCOO-,\ OCOCOO-,\ -NHCO-,$$
$$-CONH-,\ -CONHCO-,\ -CONHNHCO-,$$
$$-NHCOCONH-,$$
$$-O-CH_2-CO-O-\text{alkylene}-O-CO-CH_2-O-$$

Z may also correspond to the formula $$-X'CO-R_6-COX'-$$

in which $X'$ represents an oxygen atom, a sulphur atom or an $-NH-$ group that may be substituted in the manner described above and $R_6$ represents an aliphatic, aromatic or heterocyclic residue, preferably an ethylene- or a para-, meta- or ortho-phenylene residue, or to the formula $$-X'-CO-NH-R_7-NH-CO-X'-$$

in which $X'$ represents an oxygen atom, a sulphur atom or an $-NH-$ group and $R_7$ represents an aliphatic, aromatic or heterocyclic residue of a diisocyanate, preferably an ethylene, hexamethylene, para-phenylene or p-toluylene residue or a residue of the formula

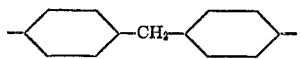

Finally, in some cases Z may correspond to the formula $-OCOX'-R_8-X'OCO-$, in which $X'$ has the meaning given above and $R_8$ represents a bifunctional organic residue, especially an aliphatic, araliphatic, aromatic or heterocyclic residue which may be interrupted by the groups $X'$ ($R_8$ thus has the same meaning as $R_7$ when $X'$ is an $-NH-$ group), or to the formula $$-X''SO_2-R_9-SO_2X''-$$

in which $X''$ represents an oxygen atom or a nitrogen atom that may be substituted and $R_9$ represents an aliphatic or aromatic residue.

The new dyestuffs may be obtained (a) by coupling two coupling components of the formula

which are linked together through a bifunctional bridging component Z which has no dyestuff characteristics and at least one of which is bound to the residue Z directly to the aromatic nucleus A, if necessary, through an alkylene bridge bound to the nucleus, with diazo compounds derived from amines of the formulae $D_1-NH_2$ and $D_2-NH_2$ to form disazo compounds, the symbols A, Z, $R_1$, $R_2$, $D_1$ and $D_2$ having the meanings given above, or (b) two identical or different dyestuffs of the formula

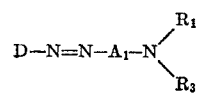

in which D and $R_1$ have the meanings given above, $A_1$ represents a 1,4-phenylene residue and $R_3$ represents an alkyl group that may be substituted or a hydrogen atom, and in which a reactive substituent is present in one of the residues $A_1$ and $R_3$, are reacted with compounds yielding the residue Z either simultaneously in one step or successively in two steps.

(I) Process (a)

(A) Coupling components: The coupling components used in process (a) of the invention are preferably those of the formula (V)
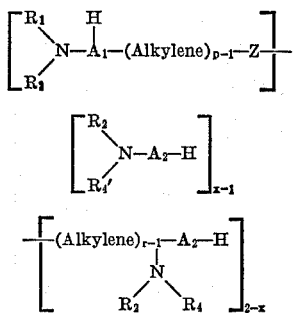

in which $A_1$, $A_2$, $R_1$, $R_2$, $R_3$, $R_4$, $R_4'$, Z $r$, $q$ and $x$ have the meanings given above, for example, the diamines of the formula

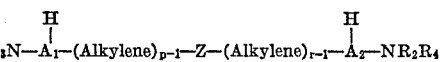

in which $R_1$, $R_2$, $R_3$, $R_4$, $A_1$, $A_2$, Z, $q$ and $r$ have the meanings ascribed to them in Formula IV, and the bifunctional coupling components of the general formula

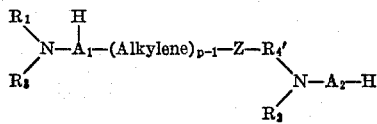

in which $q$, $A_1$, $A_2$, $R_1$, $R_2$, $R_3$, $R_4'$ and Z have the meanings ascribed to them in Formula II; they may be obtained as follows:

For example, when (1) N-hydroxyethyl-N-cyanoethyl-aniline is reacted with phosgene to form the chloroformic acid ester, and (2) meta-nitroaniline is reacted with ethylene oxide to form N,N-di-(hydroxyethyl)-meta-nitroaniline, acetylation is effected at the hydroxyethyl groups and then the meta-nitro group is hydrogenated to form the meta-amino group, condensation of the 4-amino-N,N-di-(acetoxyethyl)-aniline so obtained with the chloroformic acid ester furnishes the bifunctional coupling component of the formula

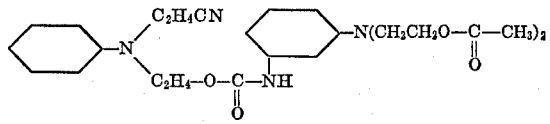

When 3-nitrophenylisocyanate is reacted with N-hydroxyethyl-N-cyanoethylaniline, the carbamic acid ester which is formed is reduced at the 3-nitro group, and the 3-amino group which is formed is reacted with acrylonitrile, the following bifunctional coupling component corresponding to the formula

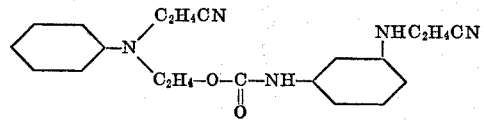

is obtained. Condensation of N-chloroethyl-N-ethylaniline with 3-nitrophenol to form the phenolether, reduction of the nitro group in 3-position of the phenolether to form a 3-amino group, and the addition of one molecule of acrylonitrile to the 3-amino group furnishes a bifunctional coupling component of the formula

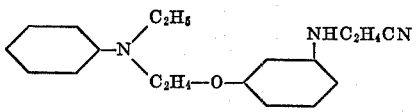

The addition of one mol of 2,4-diisocyanatotoluene having an active 4-isocyanato group to one mol of N-ethyl-N-hydroxyethylaniline produces a compound having a free 2-isocyanato group; the addition of N,N-bis-β-acetoxyethyl-3-aminoaniline to the free 2-isocyanato group furnishes the bifunctional coupling component of the formula

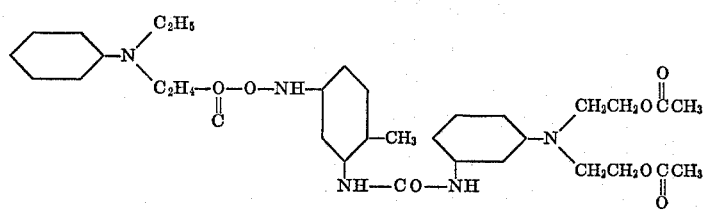

The compounds shown below are also suitable bifunctional coupling components for reaction with diazonium compounds derived from the amines of the formula $D_1$—$NH_2$ and/or the formula $D_2$—$NH_2$; however, they are preferably not coupled with heterocyclic and/or quaternatable coupling components, and, apart from the groups —$NR_1R_{13}$ and —$NR_2R_4$, they may not contain at the aromatic nucleus further groups which direct coupling.

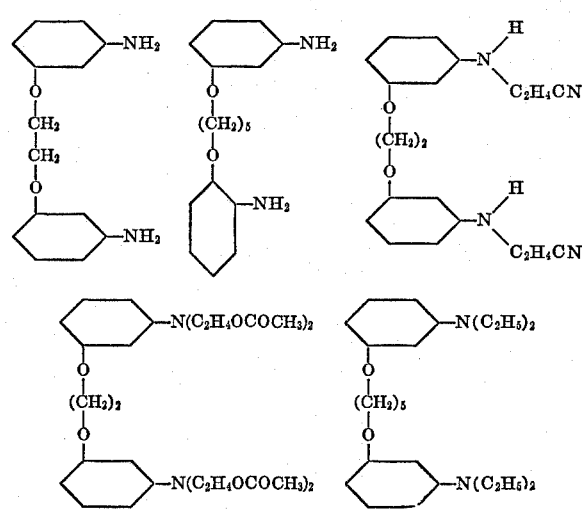

Further suitable bifunctional coupling components, which are included in the invention, are the following compounds:

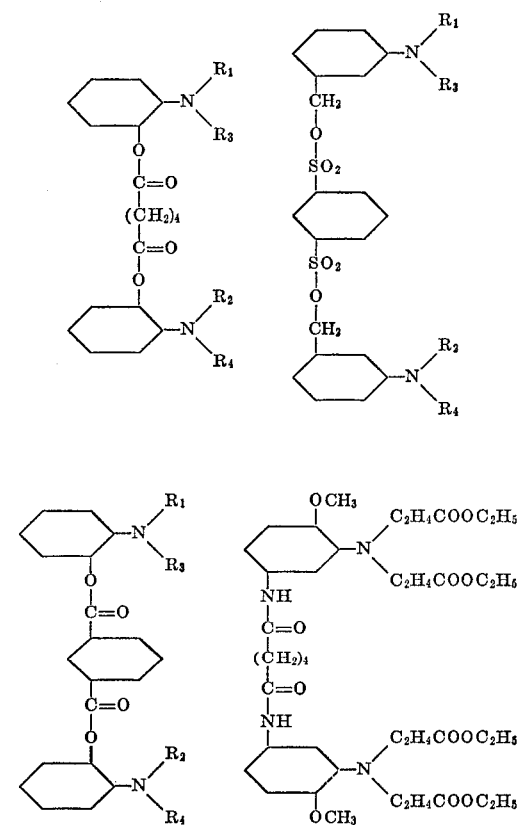

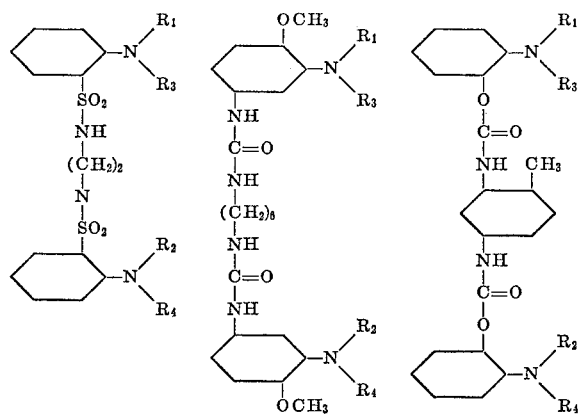

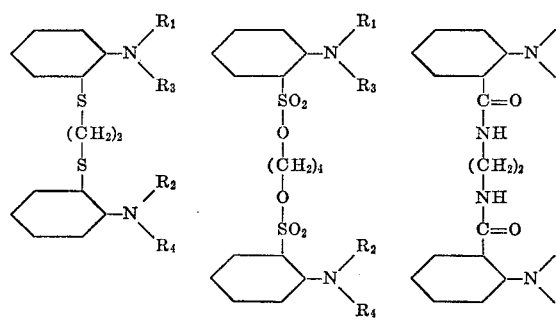

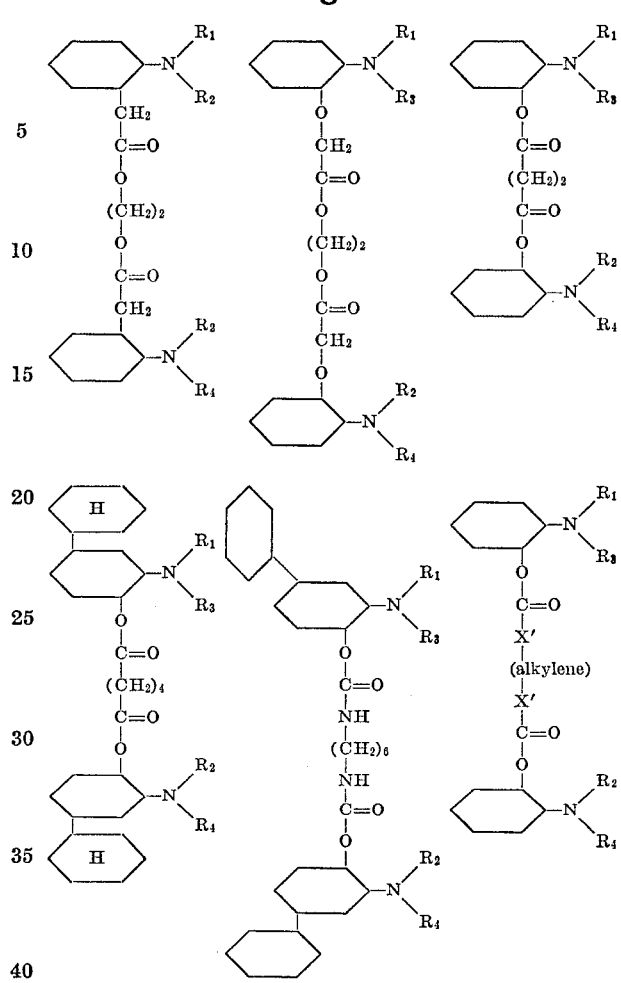

in which X' represents an —NH— group, an oxygen atom or a sulphur atom.

When ortho-nitrobenzene sulphonic acids or ortho-nitrobenzene carboxylic acids, or the reactive derivatives thereof, for example, ortho-nitrobenzene sulphonic acid chloride, are used as starting materials in the synthesis of the bifunctional coupling components, and the sulphonic acid or carboxylic acid groups are joined together, for example, through a diamide group, subsequent hydrogenation of the nitro groups and N-alkylation furnishes bifunctional coupling components of the general Formula V, in which the symbols $q$ and $r$ stand for 1. On the other hand, when, for example, ortho-nitro-benzylalcohol or ortho-nitrophenylacetic acid are used as starting materials, linkage via the oxygenated residues, hydrogenation and N-alkylation produces bifunctional coupling components of the general Formula V, in which the symbols $q$ and $r$ stand for 2. The corresponding dyestuffs are obtained by coupling with a diazonium compound.

Further suitable starting materials for use in the manufacture of the bifunctional coupling components of the Formula V are the anilines of the formula

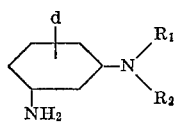

in which at least one of the groups $R_1$ and $R_2$, but preferably both, represents the residue of the formula -alkylene-Q (in which Q represents an acyloxy, hydroxy, amino or cyano group) and $d$ has the meaning given above, but is preferably a $C_{1-4}$-alkyl or -alkoxy group.

These aniline derivatives are linked to the free amino groups by means of reactive derivatives of organic bifunctional acids, especially dicarboxylic acids.

(B) Diazo components: Any diazotizable heterocyclic amine which is free from acidic substituents imparting solubility in water may be used as diazo component. However, amines that are specially suitable are those containing a heterocyclic five-membered ring having 2 to 3 hetero atoms, especially one nitrogen atom and one or two sulphur, oxygen or nitrogen atoms, and also aminobenzenes, especially those of the formula

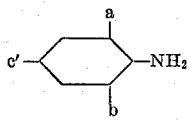

in which $a$ represents a hydrogen or a halogen atom or an alkyl, alkoxy, nitro, cyano, carbalkoxy or alkylsulphone group, $b$ represents a hydrogen or a halogen atom or an alkyl, cyano or trifluoromethyl group and $c'$ represents a nitro, cyano, carbalkoxy or alkylsulphonyl group.

The following are given as examples of heterocyclic diazo components:

2-aminothiazole,
2-amino-5-nitrothiazole,
2-amino-5-methylsulphonylthiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
3-aminopyridine,
3-aminoquinoline,
3-aminopyrazole,
3-amino-1-phenylpyrazole,
3-aminoindazole,
3-amino-1,2,4-triazole,
5-(methyl-, ethyl-, phenyl- or benzyl)-1,2,4-triazole,
3-amino-1-(4'-methoxyphenyl)-pyrazole,
2-aminobenzthiazole,
2-amino-6-methylbenzthiazole,
2-amino-6-methoxybenzthiazole,
2-amino-6-chlorobenzthiazole,
2-amino-6-cyanobenzthiazole,
2-amino-6-thiocyanothiazole,
2-amino-6-nitrobenzthiazole,
2-amino-6-carboethoxybenzthiazole,
2-amino-(4- or 6)-methylsulphonylbenzthiazole,
2-amino-1,3,4-thiadiazole,
2-amino-1,3,5-thiadiazole,
2-amino-4-phenyl- or -4-methyl-1,3,5-thiadiazole,
2-amino-5-phenyl-1,3,4-thiadiazole,
2-amino-3-nitro-5-methylsulphothiophene,
2-amino-3,5-bis(methylsulpho)-thiophene,
5-amino-3-methylisothiazole,
2-amino-4-cyanopyrazole,
2-(4'-nitrophenyl)-3-amino-4-cyanopyrazole and
3- or 4-aminophthalimide.

The following are given as examples of suitable aminobenzenes:

aminobenzene,
1-amino-4-chlorobenzene,
1-amino-4-bromobenzene,
1-amino-4-methylbenzene,
1-amino-4-nitrobenzene,
1-amino-4-cyanobenzene,
1-amino-2,5-dicyanobenzene,
1-amino-4-methylsulphonylbenzene,
1-amino-4-carbalkoxybenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-carbomethoxy-4-chlorobenzene,
1-amino-2-carbomethoxy-4-nitrobenzene,
1-amino-2-chloro-4-cyanobenzene,
1-amino-2-chloro-4-nitrobenzene,
1-amino-2-bromo-4-nitrobenzene,
1-amino-2-chloro-4-carbethoxybenzene,
1-amino-2-chloro-4-methylsulphonylbenzene,
1-amino-2-methylsulphonyl-4-chlorobenzene,
1-amino-2-methylsulphonyl-4-nitrobenzene,
1-amino-2,4-dinitrobenzene,
1-amino-2,4-dicyanobenzene,
1-amino-2-cyano-4-methylsulphonylbenzene,
1-amino-2,6-dichloro-4-cyanobenzene,
1-amino-2,6-dichloro-4-nitrobenzene,
1-amino-2,4-dicyano-6-chlorobenzene,
4-aminobenzoic acid-cyclohexylester,
1-amino-2,4-dinitro-6-chlorobenzene and especially 1-amino-2-cyano-4-nitrobenzene;

also 1-aminobenzene-2-, -3- or -4-sulphonic acid amides, for example, N-methyl- or N,N-dimethyl- or -diethyl-amide.

The preferred aminobenzenes carry negative substituents, i.e. electron-attracting substituents with a negative dipole momentum or a positive sigma-(para) value in the Hammet equation.

(C) Diazotization and coupling: Diazotization of the above-mentioned diazo components may be carried out by known methods, for example, with a mineral acid and sodium nitrite or, for example, with a solution of nitrosyl-sulphuric acid in concentrated sulphuric acid.

Coupling may also be carried out in known manner, for example, in a neutral to acid medium, if necessary, in the presence of sodium acetate or a similar buffer which influences the rate of coupling, or a catalyst, for example, dimethylformamide or pyridine or a salt thereof.

Coupling may also be effected advantageously by uniting the components in a mixing nozzle. By "mixing nozzle" is meant a device in which the liquids to be mixed are combined with one another in a comparatively small space, whereby at least one of the liquids is conducted through a nozzle, preferably under pressure. The mixing nozzle may be constructed and operated, for example, on the principle of the water jet pump, the supply of one of the liquids to the mixing nozzle corresponding to the supply of water in the water jet pump, and the supply of the other liquid corresponding to the connection between the water jet pump and the vessel to be evacuated; feed of the liquid through the latter supply route may also be effected under pressure.

However, it is also possible to use other devices to effect rapid and, if necessary, continuous mixture in a small space.

After coupling, the non-quaternated dyestuffs that are formed can easily be separated from the coupling mixture, for example, by filtration, because they are practically insoluble in water. When the dyestuffs obtained are quaternated, they may be salted out.

When the bifunctional coupling component of the Formula V is coupled with less than 2 mols of a diazonium compound of the formula D—N=N⁺ anion⁻, a mixture is formed which is a mixture of the disazo dyestuffs of the invention and monoazo dyestuffs, and this process is also included in the present invention.

(II) Process (b)

The new dyestuffs may also be obtained when, in accordance with process (b), two monoazo dyestuffs are linked together. In this process, dyestuffs of the formulae (VIa)
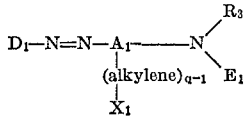

and (VIb)
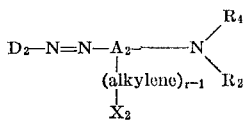

or (VIc)
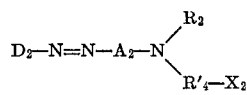

in which $X_1$ and $X_2$ each represents a group containing at least one reactive atom, for example, a carboxyl or sulphonic acid group or the acid halide derivatives thereof, or an exchangeable halogen atom, or an acylatable group, especially an amino, mercapto or hydroxyl group, or a reactive derivative thereof, and $R_1$, $R_2$, $R_3$, $R_4$, $R_4'$, $A_1$, $A_2$, $D_1$, $D_2$, $q$ and $r$ have the meaning given above, may be condensed with the bifunctional compound $Z'$ which forms the bridging component Z on condensation with the groups $X_1$ and $X_2$, to form the dyestuffs of the invention corresponding to the Formula II, or azo dyestuffs of the formulae (VIIa)     $D_1$—N=N—$A_1$—(Alkylene)$_{q-1}$—$X_1$

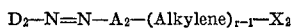

and (VIIb)     $D_2$—N=N—$A_2$—(Alkylene)$_{r-1}$—$X_2$ or (VIIc)
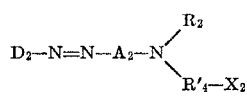

in which $D_1$, $D_2$, $A_1$, $A_2$, $R_1$, $R_2$, $R_3$, $R_4$, $R_4'$ $q$ and $r$ have the meanings given above and $X_1$ and $X_2$ each represents a group containing at least one active hydrogen atom, which group is reactive to double bonds or oxirane rings capable of additive reaction, are additively combined with a bifunctional compound of the formula $Y_1$—Z—$Y_2$ which is capable of additive reaction, in which formula $Y_1$ and $Y_2$ each represents a residue of the formula

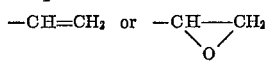

which is capable of additive reaction, or azo dyestuffs of the Formula VIa, VIb or VIc, in which $X_1$ and $X_2$ each represents an —SH group, are oxidized to diazo dyestuffs and, if necessary, the disazo dyestuffs obtained are quaternated at at least one of the residues $D_1$ or $D_2$ when they contain groups capable of quaternation.

The linkage of two dyestuffs, each of which contains an acylatable or etherifiable group (for example, —OH, —SH or an amino group) is effected by methods known per se with the aid of bifunctional reactants. These are primarily diesters, dihalides or anhydrides of organic acids, phosgene, diisocyanates, bis-carbonic acid esters and so forth. The linkage of the two monoazo dyestuffs is thus effected by methods known per se, for example, by amidation and/or esterification, especially with azeotropic splitting of water, by trans-esterification with elimination of a volatile alcohol or phenol or by reaction with acid anhydrides, by reaction with dihalides of organic sulphonic and carboxylic acids, whereby the tertiary amino group present in the coupling component may take up the hydrogen halide that is liberated; in addition to the purely organic acid chlorides, phospho-organic alkanephosphoric acid dichlorides may also be used, for example, ethane- or cyclohexane-phosphonic acid dichloride. Esters and/or amides or carbamic acid esters or ureas are obtained, depending on the starting materials used.

The following are given as examples of bifunctional reagents which introduce the group Z:

(A) Acid derivatives, for example, the anhydrides, esters or especially the halides of the following acids: oxalic acid, succinic acid, malonic acid, adipic acid, sebacic acid, maleic acid, fumaric acid, diglycollic acid, methylene-bis-thioglycollic acid, 2,3-dibromosuccinic acid, thiodibutyric acid, tetrahydrophthalic acid, hexahydrophthalic acid, endo-methylenetetrahydrophthalic acid, phthalic acid, isophthalic acid, terephthalic acid, naphthalene-1,8- or 2,6-dicarboxylic acid, 2,5-thiophene dicarboxylic acid, furan dicarboxylic acid, sulphothiophene carboxylic acid, sulphobenzoic acid, sulphoacetic acid, benzene- or naphthalene-disulphonic acid, and also phosgene.

(B) Diisocyanates, especially aliphatic or cyclic diisocyanates, for example, hexamethylenediisocyanate, cyclohexane-1,4-diisocyanate, and also aromatic diisocyanates, for example, toluene-2,4- or 2,6-diisocyanates or mixtures thereof, phenylene-1,4-diisocyanate, diphenyl-4,4'-diisocyanate, diphenylmethane-4,4'-diisocyanate and diphenylmethane-3,3'-diisocyanate.

Also given as examples are diisocyanates of the naphthalene series, for example, naphthylene-1,5-diisocyanate, or heterocyclic diisocyanates, for example, those of benzo furan or urea and diisocyanates containing uretdione groups, for example, 1,3 - bis-(4'-methyl-3'-isocyanatophenyl)-uretdione. The diisocyanates may also be prepared in situ, for example, by reacting bischloromethylbenzenes and sodium or lead cyanate in active solvents.

(C) Epoxides, especially alicyclic polyepoxides, in which at least one epoxide group is situated at the alicyclic ring, for example, vinylcyclohexene-dioxide, limonene dioxide, dicyclopentadiene dioxide, bis-(2,3-epoxycyclopentylether, ethylene glycol-bis-(3,4 - epoxytetrahydrodicyclopentadien-8-yl)-ether and (3,4 - epoxytetrahydrodicyclopentadien-8-yl)-glycidylether; compounds containing two epoxycyclohexyl residues which are bound through ester or acetal bonds, for example, diethylene glycol-bis-(3,4 - epoxycyclohexanecarboxylate), bis - 3,4-(epoxycyclohexylmethyl)-succinate, 3,4-epoxy-6-methylcyclohexylmethyl - 3,4 - epoxy - 6 - methylcyclohexanecarboxylate and also the acetal derived from 3,4-epoxyhexahydrobenzaldehyde and 3,4-epoxycyclohexane - 1,1 - dimethanol, but especially bifunctional compounds having two terminal epoxide groups, for example, butadiene diepoxide, diglycidyl ethers of dihydric alcohols, for example, glycol-di-glycidylether, diglycidyl ethers of dihydric phenols, for example, 4,4'-dihydroxydiphenylmethane, -dimethylmethane or -sulphone, diglycidyl ethers derived from polyhydric thiols, for example, bis-(mercaptomethyl)-benzenes, N,N'-diglycidyl compounds, for example, of N,N'-dimethyl - 4,4'-diaminodiphenylmethane, ethylene urea or oxamide, and diglycidyl esters of aliphatic, cycloaliphatic or aromatic dicarboxylic acids, for example, phthalic acid, hexahydrophthalic acid, tetrahydrophthalic acid or succinic acid, di- or tri-glycidylcyanurate or -isocyanurate.

All linkage reactions are carried out by methods known per se in aqueous and/or organic solvents, if necessary, in the presence of agents capable of binding acid; for example, the reaction with diisocyanates may be carried out in inert solvents or without the use of a solvent, but it may also be carried out in active solvents.

Phosgene may be reacted directly, if necessary stepwise, that is to say, by first preparing the chloroformic acid ester of one of the azo dyestuffs, but bis-carbonic acid diester or diamide (=bis-urea) bridges or bis-carbamic acid ester bridges or combinations of such bridges may also be obtained when, for example, 2 mols of the chloroformic acid ester of an azo dyestff are reacted with one mol of a diol, a diamine or a dithiol to form diurethane, bis-(thiourethane) or to form the bis-urea compound.

The following are given as examples of such bifunctional aliphatic, cycloaliphatic, araliphatic or aromatic hydroxyl, mercapto or amino compounds: -1,2-dihydroxyethane, 1,2- or 1,3-dihydropropane, 1,2- or 1,3- or 1,4- or 2,3-dihydroxybutane, 1,2- or 1,3- or 1,4- or 1,5- or 2,3- or 2,4-dihydroxypentane, the corresponding dihydroxyhexanes, heptanes, octanes, nonanes, decanes, undecanes, dodecanes, hexadecanes, octadecanes, 1,4-dihydroxybutene, 1,4-dihydroxy-2-methylbutane, 1,5-dihydroxy-2,2-dimethylpentane, 1,5-dihydroxy-2,2,4-trimethylpentane, di-($\beta$-hydroxyethyl)-thioether, di-($\beta$ - hydroxyethyl)-ether (=diglycol), triglycol, cyclohexanediol-1,2 or -1,3 or -1, 4, 4,4'-dihydroxydicyclohexylmethane, 4,4'-dihydroxydicyclohexylmethylmethane, 4,4'-dihydroxydicyclohexyldimethylmethane, 4 - hydroxybenzylalcohol, 1,4-di-($\beta$-hydroxyethoxy)-benzene, 1,2- or 1,3- or 1,4-dihydroxybenzene, 1-methyl-2,4-(or -2,3- or -3,4- or -2,6- or -2,5- or -3,5)-dihydroxybenzene, 1,3-dimethyl-2,4- (or -4,6)-dihydroxybenzene, 1,4-dimethyl-2,5-dihydroxybenzene, 1-ethyl-2,4-dihydroxybenzene, 1 - isopropyl-2,4-dihydroxybenzene, 2,4- or 4,4'-dihydroxydiphenylether, 2,2'-dihydroxyethyleneglycol-diphenylether, 1,3- or 1,4- or 1,5- or 1,6- or 1,7- or 1,8- or 2,6- or 2,7-dihydroxynaphthalene, 4,4'-dihydroxydiphenylamine, 2,4'- or 4,4'-dihydroxydiphenyl, 4,4' - dihydroxydiphenylmethane, 4,4'-dihydroxydiphenylmethylmethane, 4,4'-dihydroxydiphenyldimethylmethane, 1,1'-di-(4'-hydroxyphenyl)-cyclohexane, 4,4' - dihydroxydiphenyl-(di)-sulphide, 4,4' - dihydroxydiphenylsulphone or corresponding aliphatic and aromatic dithiols.

1,2 - diaminoethane, 1,2- or 1,3-diaminopropane, 1,2- or 1,3- or 1,4- or 2,3-diaminobutane, 1,2- or 1,3- or 1,4- or 1,5- or 2,3- or 2,4-diaminopentane, the corresponding diaminohexanes, heptanes, octanes, nonanes, decanes, undecanes, dodecanes, hexadecanes, octadecanes, 1,4-diaminobutene, 1,4 - diamino-2-methylbutane, 1,5-diamino-2,2-dimethylpentane, 1,5-diamino-2,2,4-trimethylpentane, di-($\beta$-aminoethyl)-thioether, di-($\gamma$-aminopropyl)-ether, di-($\gamma$-aminopropylether - $\omega,\omega$ - diamine, di-($\omega$-aminohexyl)-aminopropylether - $\omega,\omega$ - diamine, di - ($\omega$ - aminohexyl)-tnioether, N,N - dimethyldiaminoethane-1,2, N,N'-diethyl-diaminoethane-1,2, 1-amino-3-methylaminopropane, isophoronediamine, piperazine, N - 2 - aminoethylpiperazine, 4-aminopiperidine, $\omega,\omega$-diamino-1,3- (or -1,4)-dimethylbenzene, $\omega,\omega$-diamino-1,4- (or -1,2)-dimethylcyclohexane, $\omega,\omega$ - diamino - 1,4 - diethylbenzene, $\omega,\omega$ - diamino-1,4- (or -1,5) - dimethylnaphthalene, $\omega,\omega$ - diamino - di - n-propyl-biphenyl, 1,2- or 1,3- or 1,4-diaminocyclohexane, 1-methyl-2,4-diaminocyclohexane, 1 - ethyl - 2,4-diaminocyclohexane, 4,4' - diaminodicyclohexylmethane, 4,4' - diaminodicyclohexylmethylmethane, 4,4' - diaminodicyclohexyldimethylmethane, 4,4' - diamino - 2,2'-dimethyldicyclohexylmethane, 4,4' - diamino - 3,3' - dimethyldicyclohexylmethane, 4 - aminobenzylamine, 2 - (4' - aminophenyl)-1-aminoethane, 1 - (3' - aminophenyl)-1-aminoethane, 3-(3'- or 4' - aminophenyl) - 1 - aminopropane, 3-(3'- or 4' - aminophenyl) - 1 - aminobutane, tetrahydronaphthylenediamine-1,5 or -1,4, hexahydrobenzidine-4,4'-diamine, hexahydrodiphenylmethane - 4,4' - diamine, 1,2-, 1,3-, 1,4-diaminobenzene, 1-methyl-2,4- (or -2,3- or -3,4- or -2,6- or -2,5- or -3,5)-diaminobenzene, 1,3-dimethyl-2,4- (or -4,6-)-diaminobenzene, 1,4-dimethyl-2,5-diaminobenzene, 1-ethyl-2,4-diaminobenzene, 1-isopropyl-2.4-diaminobenzene, diaminodiethylbenzene, diisopropyl-diaminobenzene, 1-chloro-2,4-diaminobenzene, 1,3-dichloro-2,4- (or -4,6)-diaminobenzene, 1,4-dichloro - 2,5 - diaminobenzene, 2,4- (or 4,4')-diaminodiphenylether, ethyleneglycoldiphenylether-2,2'-diamine, diethyleneglycoldiphenylether - 2,2' - diamine, N,N'-dimethylphenylenediamine-1,3 or -1,4, N-methylphenylenediamine-1,4; 1,3- or 1,4- or 1,5- or 1,6- or 1,7- or 1,8- or 2,6- or 2,7-naphthyl-enediamine, 1,1'- dinaphthyl-2,2'-diamine, 4,4'-diaminodiphenylamine, 2,4'- or 4,4'-diaminodiphenyl, 3,3'-dimethyl-4,4'-diaminodiphenyl, 2,2'- or 3,3'-dichloro-4,4'-diaminophenyl, 4,4'-diaminodiphenylmethane, 4,4'-diaminophenylethane, 4,4' - diaminodiphenyldimethylmethane, 2,2'-dimethyl-4,4'-diaminodiphenylmethane, 2,5,2',5' - tetramethyl-4,4'-diaminodiphenylmethane, 1,1-di-(4'-aminophenyl)-cyclohexane, 1,1-di-(4'-amino-3'-methylphenyl)-cyclohexane, 3,3'-diaminobenzophenone, 2,4 - diaminodiphenylethane-1,2, 4,4',4"-triaminotriphenylmethane, 4,4'-diamino - 2,2',5,5' - tetramethyltriphenylmethane, 4,4'-diamino - 2,2',5,5'-tetramethyl-2"-chlorotriphenylmethane, fluorenediamine-2,7- or 2,6-diamino-anthraquinone, 9-ethylcarbazole - 3,6 - diamine, pyrene-3,8-diamine, chrysene-2,8-diamine, benzidinesulphone-4,4'-diamine, diphenylsulphide - 2,4 - diamine, diphenyldisulphide-4,4'-diamine, diphenylsulphone-4,4' - diamine, diphenylmethanesulphone-4,4'-diamine, 4-methyl-3-aminobenzenesulphonic acid-(4'-aminophenyl)-ester, di-(4-aminobenzenesulphonyl)-ethylenediamine-3,3' - dimethoxy - 4,4' - diaminodibenzylthioether, 4,4' - dimethoxy-3,3'-diaminobenzothioethyleneglycol and 3,3'-dimethoxy-4,4'-diaminodibenzylsulphone.

In addition to dialcohols, dithiols and diamines, bifunctional compounds which contain two different types of the functions mentioned above may also of course be used.

The introduction of ether bridges is effected, for example, by reacting alkali phenolates with dichloro compounds, for example, 1,4-dichlorobutene, di-$\beta$-chloroethylether, dichloroethylformaldehyde and isomers of bis-(chloromethyl)-benzene, or also by additive reaction with bifunctional compounds containing double bonds capable of additive reaction (for example, divinylsulphone) or rings capable of additive reaction, for example, dihydropyranyl rings (cf., for example, British patent specification No. 996,705) or especially epoxy rings.

The dyestuffs of the Formulae VIIa, VIIb and VIIc may be reacted with the last-mentioned compounds; the monoazo dyestuffs described in Belgian patent specifications Nos. 685,628, 685,765, 685,766 and 685,768 which correspond to the Formula VIIc may also be used, the group of the formula —R'$_4$—X$_2$ representing a $\beta$-(vinylsulphone)-ethyl group.

When the two dyestuffs of the Formula VIIa, VIIb or VIIc, in which the groups X$_1$ and X$_2$ each represent a reactive primary or monoalkylated amino group, are reacted with a diepoxide of the formula

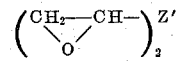

a dyestuff of the invention of the Formula II is obtained, in which Z represents the residue of the formula

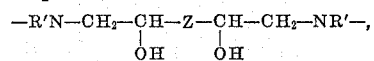

R' representing a hydrogen atom or an alkyl residue.

The reaction of amino groups present in the aromatic nucelus is one of the fundamental reactions in epoxy resin chemistry, and all aspects of it have therefore been studied; for example, the work of Lee and Neville, "Epoxy Resins," New York 1957, and Houben-Weyl, "Methoden der Organischen Chemie," vol. 14, part 2, Stuttgart, 1963, pp. 462–567. Reaction with other functional groups and the diepoxides generally used in epoxy resin technology has also been dealt with extensively.

In accordance with the invention, quaternation of the new diazo dyestuffs of the Formula II may be carried out when at least one of the two residues D$_1$ and D$_2$ is capable of quaternation. When $x=1$, $q=1$ and $r=1$ and D$_1$ and D$_2$ each represents a heterocyclic system and Z contains two oxygen atoms bound directly to the aromatic residues A$_1$ and A$_2$ or two carboxylic acid amide groups bound through the nitrogen atom, the bridging component Z also contains either an unsaturated, aromatic or heterocyclic residue or a carbon chain interrupted by at least one hetero atom. Generally, the finished disazo dyestuffs are used as starting materials which, for this purpose, are treated with esters of strong mineral acids or organic sulphonic acids, for example, dimethyl sulphate, alkyl or aralkyl halides, for example, methyl bromide or benzyl chloride, methane sulphonic acid methyl esters or esters of benzene sulphonic acids that may be substituted, for example, 4-methyl-, 4-chloro- or 4-nitro-benzenesulphonic acid ethylesters. Alkylation is preferably effected by heating in an inert organic solvent, for example, xylene, carbon tetrachloride, ortho-dichlorobenzene and nitrobenzene. However, other solvents may also be used, for example, acetic anhydride, dimethylformamide, actonitrile or dimethyl sulphoxide. The quaternated dyestuffs preferably contain as an ion the residue of a strong acid, for example, sulphuric acid or a semi-ester thereof, or a halide ion; however, they may also be used as double salts, for example, with zinc chloride, or as free bases.

Also included in the invention are the bifunctional coupling components of the general formula

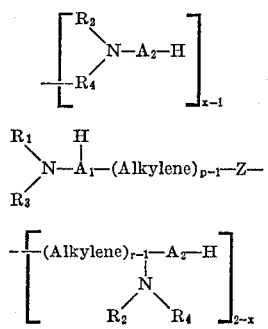

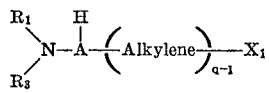

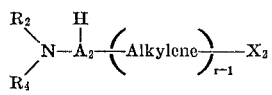

in which $A_1$, $A_2$, $R_1$, $R_2$, $R_3$, $R_4$, $R'_4$, $x$, $r$, $q$ and $Z$ have the meanings ascribed to them in Formula II; they may be obtained by condensing a compound of the formula

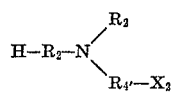

with a compound of the formula

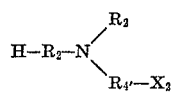

or with a compound of the formula

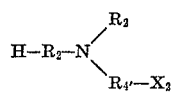

in which formulae the symbols $A_1$, $A_2$, $R_1$, $R_2$, $R_3$, $R_4$, $R'_4$, $X_1$ and $X_2$ have the meanings ascribed to them in the Formulae VIa, VIb, and VIc.

Preference is given to the diamines of the formula

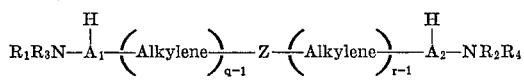

in which $R_1$, $R_2$, $R_3$, $R_4$, $A_1$, $A_2$, $Z$, $q$ and $r$ have the meanings ascribed to them in the Formula IV.

These diamines may be obtained by carrying out the reactions described above under (b) or (c) with a bifunctional compound of the formula Z', in which, however, the dyestuff component is replaced by the corresponding coupling components of the formulae

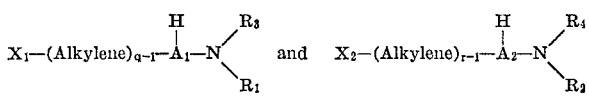

in which $R_1$, $R_2$, $R_3$, $R_4$, $R'_4$, $A_1$, $A_2$, $q$ and $r$ have the meanings given above and $X_1$ and $X_2$ each represents a group containing at least one reactive hydrogen atom, for example, a carboxyl or sulphonic group, preferably an acylatable group, for example, principally an amino, mercapto or hydroxyl group, or a reactive derivative thereof, or a reactive halogen atom.

It is advantageous to use as starting materials the corresponding nitro compounds of the formulae

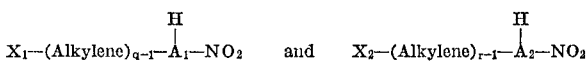

in which $R_1$, $R_2$, $R_3$, $R_4$, $A_1$, $A_2$, $q$, $r$, $X_1$ and $X_2$ have the meanings given above, and to react the nitro compounds with a bifunctional compound of the formula Z' in the manner described above to form the bis-nitro compounds of the formula

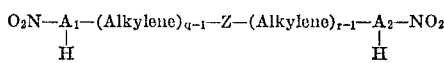

The bis-nitro compounds are subsequently reduced to the bis-amino compounds, this being effected in known manner, Suitable processes are catalytic reduction with hydrogen in the presence of Raney metals, for example, Raney nickel, or noble metal catalysts, for example, platinum and palladium catalysts, and also reduction with reducing agents, for example, tin or iron, in the presence of an acid. If necessary, the free bis-amino compounds obtained are then alkylated in the amino groups, the alkylating agent used being an alkyl halide, for example, ethyl chloride, a monoepoxide, for example, ethylene oxide, a halogenohydrin, for example, ethylenechlorohydrin, or ethyleneimine. If desired, the alkyl groups situated at the nitrogen atom may be further reacted, for example, β-hydroxyethyl or β-aminoethyl groups may be acylated with acid chlorides, anhydrides or isocyanates.

III Use

The dyestuffs described above, mixtures of these dyestuffs with one another, and mixtures of these dyestuffs with other azo dyestuffs are eminently suitable, especially after conversion into a finely divided form, for example, by grinding, pasting, reprecipitation, and so forth, for dyeing and printing man-made fibres, for example, acrylic or acrylonitrile fibres, polyacrylonitrile fibres and copolymers of acrylonitrile and other vinyl compounds, for example, acrylic esters, acrylic amides, vinyl pyridine, vinyl chloride or vinylidene chloride, copolymers of dicyanoethylene and vinylacetate, acrylonitrile block co-polymers, fibers made from polyurethane, cellulose triacetate, cellulose acetate (so-called 2½-acetate), polyamides, for example, nylon 6, nylon 6.6 or nylon 12, and especially fibers made from aromatic polyesters, for example, fibres made from terephthalic acid and ethylene glycol or 1,4-dimethylolcyclohexane, and copolymers of terephthalic and isophthalic acid and ethylene glycol.

The present invention therefore also includes processes for dyeing or printing man-made fibers, especially polyester fibres, wherein water-insoluble disazo, dyestuffs of the invention free from carboxyl and sulphonic groups, in which the residues of the Formula I are joined together through a divalent bridging component Z having no dyestuff characteristics, but especially those of the Formula II, mixtures of these dyestuffs with one another and mixtures of these dyestuffs with other azo dyestuffs are used.

The dyeing process, especially when dyeing fibres containing ester groups, is preferably carried out with dyestuffs containing the diacyl residue of a bifunctional organic acid, especially a dicarboxylic acid, in the colourless bridging component Z.

Furthermore, fibres containing ester groups are advantageously dyed with dyestuffs of the Formula III in which at least $R_1$ and $R_2$ and preferably also $R_3$ and $R_4$ each represents a β-acyloxy, β-cyano or β-hydroxyethyl group, the acyl residue being the residue of an organic acid.

When the above-mentioned new dyestuffs of the Formula II contain one or two quaternated diazo component residues of the formula $D_1$ and/or $D_2$, they are eminently suitable for dyeing fibres and fabrics of the polyacrylic type. In this field of application the preferred dyestuffs are those corresponding to the Formula III.

The preferred dyestuffs of the Formula IV are those in which $q$ and $r$ each has the value 2.

For dyeing, the water-insoluble, non-quaternated dyestuffs are advantageously used in a finely divided form and in the presence of a dispersing agent, for example, sulphite cellulose waste liquor or a synthetic detergent, or a combination of different wetting and dispersing agents. Prior to dyeing it is generally advantageous to convert the dyestuff into a dyeing preparation which contains a dispersing agent and the finely divided dyestuff in a form such that a fine dispersion is formed when the preparation is diluted with water. Such dyestuff preparations may be obtained in known manner, for example, by grinding the dyestuff in the dry or wet state in the presence or absence of a dispersing agent.

Alternatively, the aforementioned synthetic fibers may be dyed in a solution of the dyestuff in an organic solvent.

To obtain stronger dyeings on polyethylene terephthalate fibres it is advantageous to add a swelling agent to the dye-bath, or to carry out the dyeing process under superatmospheric pressure at a temperature of above 100° C., for example, at 120° C. Suitable swelling agents are aromatic carboxylic acids, for example, benzoic acid or salicyclic acid, phenols, for example, ortho- or para-hydroxydiphenyl, salicyclic acid methyl ester, aromatic halogen compounds, for example, chlorobenzene, ortho-dichlorobenzene or trichlorobenzene, phenylmethylcarbinol or diphenyl. When carrying out the dyeing process under superatmospheric pressure, it is generally advantageous to render the dyebath slightly acid, for example, by the addition of a weak acid, for example, acetic acid.

The non-quaternated, water-insoluble dyestuffs to be used in accordance with the invention are specially suitable for application by the so-called thermofixation process in which the fabric to be dyed is impregnated preferably at a temperature not exceeding 60° C. with an aqueous dispersion of the dyestuff which advantageously contains 1 to 50% of urea and a thickening agent, especially sodium alginate, and squeezed in the usual manner. The fabric is advantageously squeezed so as to retain 50 to 100% of its dry weight of dye-liquor.

To fix the dyestuff, the fabric so impregnated is heated to a temperature of above 100° C., for example, to a temperature betwen 180 and 210° C., preferably after drying, for example, in a current of warm air.

The above-mentioned thermofixation process is specially suitable for dyeing union fabrics made from polyester fibres and cellulosic fibres especially cotton. In this case, the padding liquor contains, in addition to the non-quaternated, water-insoluble dyestuff to be used in accordance with the invention, dyestuffs which are suitable for dyeing cotton, for example, direct dyestuffs or vat dyestuffs, or especially the so-called reactive dyestuffs, that is to say, dyestuffs that can be fixed on the cellulosic fibre with formation of a chemical bond, for example, dyestuffs which contain a chlorotriazine or a chlorodiazine residue. Inu the latter case it is advantageous to add an agent capable of binding acid to the padding solution, for example, an alkali metal carbonate or an alkali metal phosphate or an alkali metal borate, or a mixture thereof. When using vat dyestuffs, the padded fabric has to be treated after the heat treatment with an aqueous alkaline solution of one of the reducing agents commonly used in vat dyeing.

The dyeings produced on polyester fibres by the said process are advantageously subjected to an after-treatment, for example, by heating with an aqueous solution of a nonionic detergent.

The dyestuffs may also be applied by printing processes. In this method of application a printing paste, for example, is used which contains the finely divided dyestuffs, if necessary, in admixture with one of the above-mentioned cotton dyestuffs, as well as the adjuvants normally used in printing, for example, wetting and thickening agents, if necessary, in the presence of urea and/or an agent capable of binding acid.

The processes indicated produce strong dyeings and prints possessing excellent properties of fastness, especially good fastness to light, sublimation, decatizing, washing and chlorinated water. Dyeings on secondary acetate rayon are also distinguished by good fastness to gas fading. A further advantage of the dyestuffs to be used in accordance with the invention is that they reserve well on wool and cotton.

The new water-insoluble, non-quaternated dyestuffs may also be used for the spin-coloration of polyamides, polyesters and polyolefines. The polymer to be coloured is advantageously admixed with the dyestuff in the form of a powder, grains or chips, as a solution ready for spinning or in the form of a melt; the dyestuff may be in the dry state, or in the form of a dispersion or a solution in a solvent which may be volatile. After the dyestuff has been homogeneously dispersed in the polymer solution or melt, the mixture is processed in known manner into fibres, yarns, monofilaments, films and so forth in known manner, for example, by casting, moulding or extruding.

The water-soluble quaternated dyestuffs or dyestuff salts are suitable for dyeing a very wide variety of manmade fibres, for example, polyvinyl chloride, polyamide, polpurethane and especially polyacrylic fibres. Dyestuffs of the Formula IV, in which a quaternated aliphatic amino group is present in each of the diazo component residues $D_1$ and $D_2$, also show affinity for untannined cotton.

The new dyestuffs are also suitable for colouring polymerization products of acrylonitrile, polyolefines and other plastics by addition to the composition prior to the shaping operation, and they may also be used for colouring oil paints and lacquers. The above-mentioned thermofixation process may also be applied.

Some of the new water-insoluble, non-quaternated products are valuable pigments which may be used for a very wide variety of purposes. For example, they may be used in a state of fine division for the spin-coloration of filament and staple-fibre viscose and cellulose ethers and esters, for the production of inks, especially inks for ballpoint pens, and in the production of coloured lacquers and lake-formers, solutions or products made from cellulose acetate, nitrocellulose, natural or synthetic resins, for example, polymerization resins or condensation resins, for example, aminoplasts, alkyd resins and phenoplasts, and also polyofines, for example, polystyrene, polyethylene, polypropylene, polyvinyl chloride, polyacrylonitrile, rubber, casein, silicones and silicone resins.

The following examples illustrate the invention. Unless otherwise stated, the parts and percentages are by weight.

PREPARATION OF THE BIFUNCTIONAL COUPLING COMPONENTS

Procedure IA

Preparation of the bis-nitro compound: 50 parts of ethylene bromide are added dropwise at 80 to 83° C. while stirring to a mixture comprising 55.6 parts of 3-nitrophenol, 100 parts of ethyl alcohol and 22.4 parts of potassium hydroxide; the batch is then stirred for 15 hours under reflux, cooled and filtered. The residue is washed successively with warm water and a small amount of cold ethyl alcohol, squeezed, and then dried at 60 to 70° C. 29 grams of the product of the formula

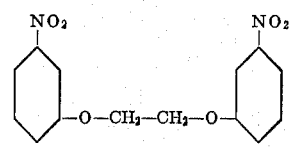

melting at 139.5 to 140.5° C. are obtained.

*Analysis.*—Calculated (percent): C, 55.2; H, 4.0; N, 9.2. Found (percent): C, 55.1; H, 3.9; N, 9.0.

Procedure IB

Preparation of the bis-amine: 6.08 parts of the above product are hydrogenated in 250 parts of absolute ethyl alcohol with a catalyst comprising 10% of palladium on carbon; the hydrogen uptake amounts to 2.7 litres (100% of the theoretical uptake). When the uptake of hydrogen is finished, the batch is heated to the boil in the presence of a small amount of animal charcoal and then filtered hot over kieselguhr. 3.2 parts of the diamine of the formula

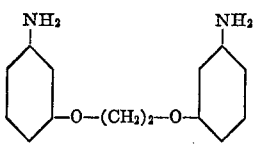

crystallize out of the filtrate in the form of fine white needles melting at 134 to 135° C.

Procedure IIa

Preparation of the bis-nitro compound: 9.15 parts of adipic acid dichloride are added dropwise at 15 to 20° C. to a solution of 13.8 parts of meta-nitroaniline in 160 parts of pyridine, and the batch is stirred for 2 hours at room temperature. The precipitate which forms is isolated on a filter press, washed with water, a 10% sodium carbonate solution and alcohol, and then dried in a vacuum cabinet at 60° C. 12.1 parts of the product of the formula

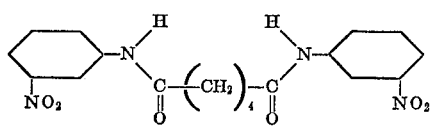

melting at 240 to 245° C. are obtained.

Procedure IIb

Preparation of the bis-amine: The bis-nitro compound prepared in accordance with Procedure IIa is hydrogenated in accordance with Procedure Ib to produce the diamine of the formula

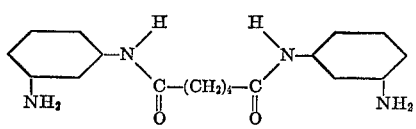

65 parts of the amine so obtained, together with 150 parts of acrylonitrile and 12 parts of glacial acetic acid, are heated to 135 to 140° C. in an autoclave and the batch is stirred at that temperature for 15 hours. The autoclave is emptied, the solution is concentrated in vacuo, allowed to stand for sometime, the precipitate is isolated by filtration and then triturated with a small amount of ether. After drying, a product of the formula

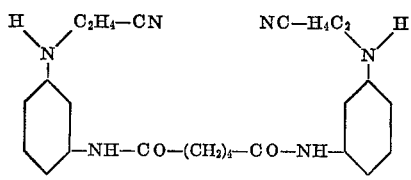

is obtained. The compounds corresponding to the following formulae are obtained in an analogous manner:

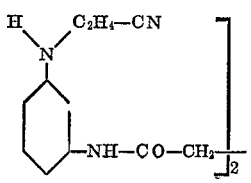

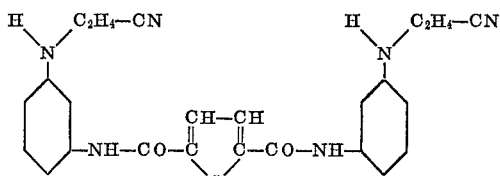

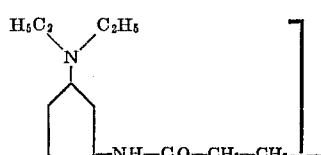

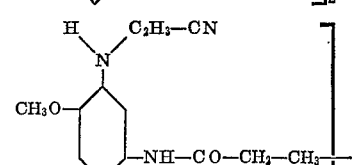

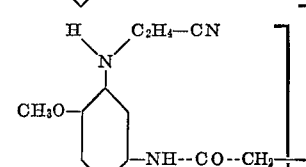

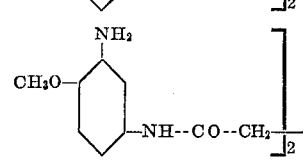

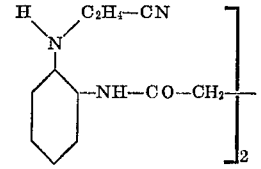

Procedure IIIa

N-bis-β-acetoxyethyl-3-nitroaniline: 1 mol of N-bis-β-hydroxyethyl - 3-nitroaniline (obtainable in accordance with Swiss patent specification No. 171,721) and 2.2 mols of acetic anhydride are heated together for 3 hours at 130° C. The glacial acetic acid is then removed in vacuo and the residue is distilled in a high vacuum N-bis-β-acetoxy-ethyl-3-nitroaniline is obtained.

*Analysis.*—Calculated (percent): C, 54.19; H, 5.85; N, 9.03. Found (percent): C, 54.25; H, 5.78; N, 9.05.

N-bis-β-acetoxyethyl-3-aminoaniline: 2 mols of N-bis-β-acetoxyethyl-3-nitroaniline are hydrogenated in 2 litres of absolute ethanol in the presence of Pd/carbon; the solvent is then removed in vacuo and the residue is distilled in a high vacuum. N-bis-β-acetoxyethyl-3-amino-aniline is obtained.

Procedure IIIB

Preparation of the bifunction coupling component: 1/10 mol of N-bis-β-acetoxyethyl-3-aminoaniline and 9 grams of pyridine are dissolved in 40 grams of chlorobenzene, and then 1/20 mol of thiophene-2,5-dicarboxylic acid chloride is added in portions at 70 to 75° C. The batch is stirred overnight, the solvent is removed in vacuo, and the residue, which solidifies after some time, is recrystallized from methanol. The bis-amine of the formula

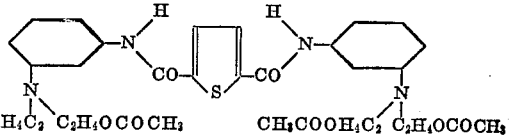

is obtained. The following compounds may be obtained in an analogous manner:

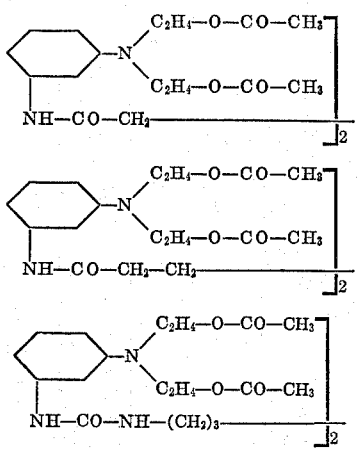

Procedure IV (A) Preparation of N,N-bis(β-cyanoethyl)-3-acetylaminoaniline: 150 parts of 3-aminoacetanilide (prepared by acetylation of 3-nitroaniline and subsequent reduction), together with 9 parts of copper (I) chloride, 65 parts of glacial acetic acid and 150 parts of acrylonitrile, are heated in an autoclave for 20 hours at 120° C. The mixture is then cooled and stirred for some time in the presence of dilute hydrochloric acid. The precipitate is isolated by filtration, washed well with water and then dried in vacuo. After recrystallisation from ethyl acetate, the product of the formula

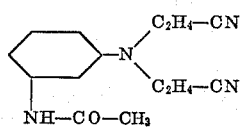

is obtained.

(B) Preparation of 3-amino-N,N-bis(β-cyanoethyl)-aniline: 10 parts of N,N-bis-β-cyanoethyl-3-acetylaminoaniline are stirred for 3 hours under reflux in 100 parts by volume of ethanol in the presence of concentrated hydrochloric acid. Immediately afterwards the solvent is evaporated by means of a rotational evaporator, the residue is dissolved in cold water, and the pH of the solution is adjusted to 6 to 7 by the addition of a 10% sodium carbonate solution. The precipitate obtained, which is oily at first, solidifies after some time. It is isolated by filtration, washed well with water and then dried in vacuo. The product of the formula

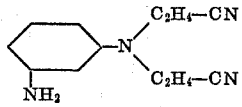

is obtained.

The infra-red spectrum shows unequivocally that the cyano groups are not saponified, but that the acetyl group has been completely split off.

The products of the following formulae are obtained therefrom by reaction with dicarboxylic acid chlorides or isocyanates in a manner analogous to Procedure III:

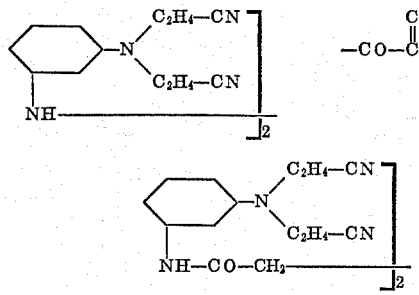

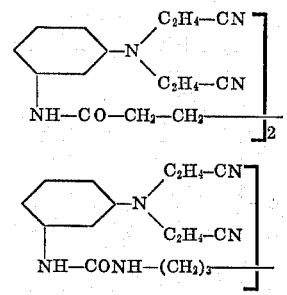

Procedure V (A) Preparation of the bis-nitro compound: 37.6 parts of 3-nitrophenylisocyanate are suspended in 100 parts by volume of chlorobenzene; 7.1 parts of ethylene glycol are added dropwise and then a further 20 parts by volume of chlorobenzene are introduced. The batch is then heated to 70° C., stirred overnight at that temperature, and the reaction mixture is then cooled. The precipitate is isolated by filtration, washed with a small amount of ethanol and then dried in vacuo. A product of the formula

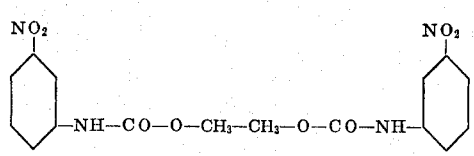

is obtained.

(B) Preparation of the bis-amine: 33 parts of the bis-nitro compound so obtained are hydrogenated in 200 parts by volume of dimethylformamide in the presence of 10% palladium/carbon as catalyst. The catalyst is removed by filtration and the solution is slowly added to an excess of iced water; the precipitate which forms is isolated by filtration, washed with water and then dried in vacuo. A product of the formula

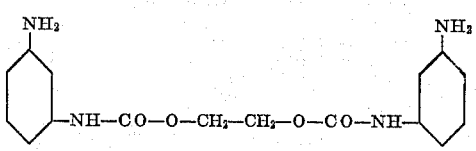

is obtained. The compounds of the following formulae may be obtained in an analogous manner:

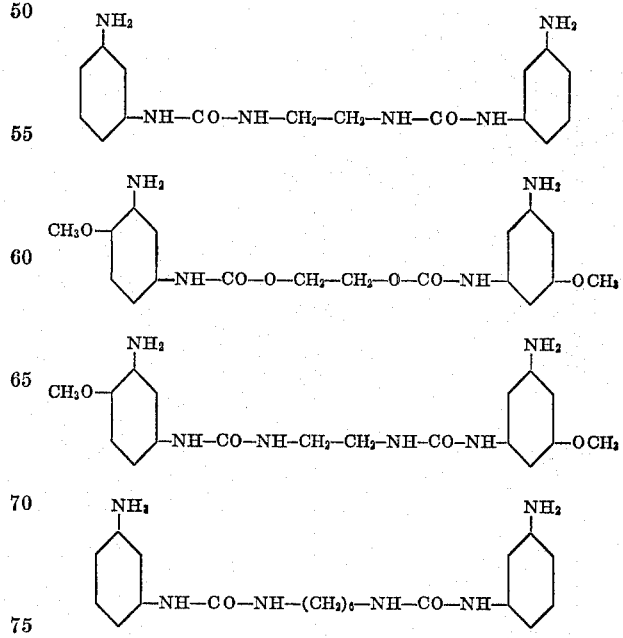

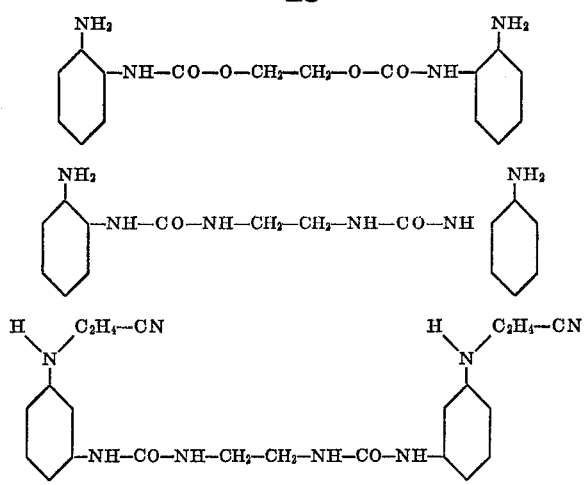

Procedure VI (A) Preparation of the bis-nitro compound: (a) 23.7 parts of ortho-nitrochlorobenzene, 4.6 parts of ethylene glycol and 150 parts by volume of dimethylsulphonxide are heated to 70° C. while stirring, 30 parts of a 30% sodium hydroxide solution are added dropwise at a temperature between 70 and 80° C., the reaction mixture is heated to 85 to 90° C., and then stirred overnight at that temperature. The mixture is discharged on to ice, the whole is stirred for some time and the precipitate is isolated by filtration. The residue is then washed well with water and dried in vacuo.

(b) 35.4 parts of 2-nitrophenol-potassium are suspended in 75 parts by volume of ethanol and the suspension is heated to 70° C. 18.8 parts of ethylene bromide are added dropwise at that temperature and the mixture is stirred overnight under reflux. After cooling, the precipitate is isolated by filtration, washed well with water and then with a small amount of cold ethanol, and dried in vacuo.

In both processes a product of the formula

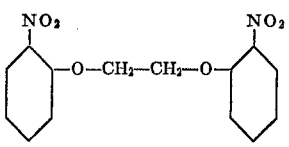

is obtained.

(B) Preparation of the bis-amine: 11 parts of the bis-nitro compound so obtained are hydrogenated in 120 parts of dioxane in the presence of Raney-nickel as catalyst. The catalyst is removed by filtration, the solvent is removed in vacuo, and a product of the formula

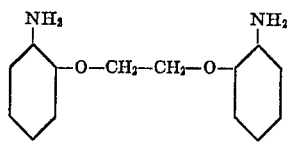

is obtained. The following compounds may be obtained in an analogous manner:

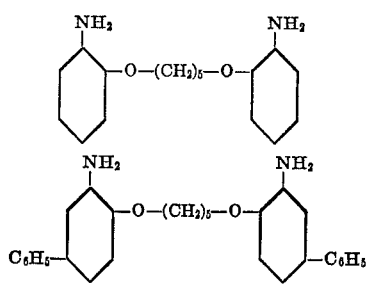

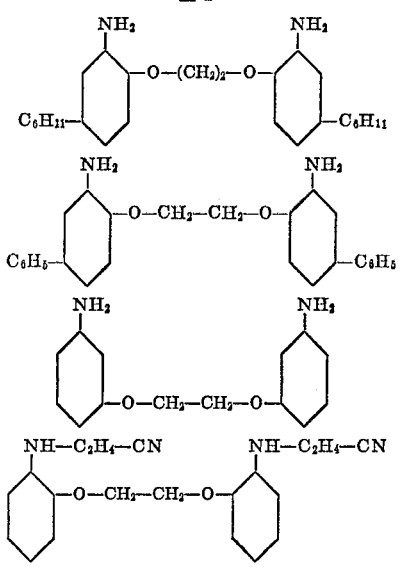

Procedure VII 9.5 parts of N - β - cyanoethyl-N-β-hydroxyethylaniline are dissolved in 25 parts by volume of chlorobenzene, and then 8.2 parts of 3-nitrophenylisocyanate are slowly added. A further 25 parts by volume of chlorobenzene are added, the batch is slowly heated to 70° C. and then stirred overnight at that temperature. After cooling, the solvent is removed by means of a rotational evaporator, and the residue, which solidifies after being allowed to stand for a prolonged period of time is triturated with ether. The residue is isolated by filtration and then dried in vacuo. A product of the formula

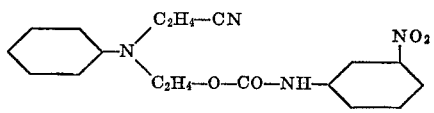

is obtained.

53 parts of the product so obtained are hydrogenated in 500 parts by volume of dimethylformamide, in the presence of palladium-carbon (10%) as catalyst. The catalyst is removed by filtration, the solvent is removed and a product of the formula

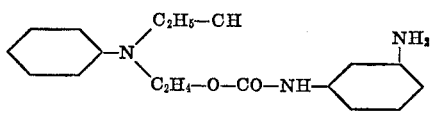

is obtained. By using 2-nitrophenylisocyanate instead of 3-nitrophenylisocyanate, the bifunctional coupling component of the formula

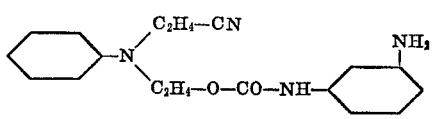

is obtained.

The bifunctional coupling components of the following formulae may be obtained in an analogous manner by reacting the N-bis-β-acetoxyethyl-3-aminoaniline described above with 2- or 3-nitrophenylisocyanate and then hydrogenating:

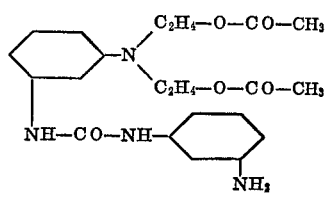

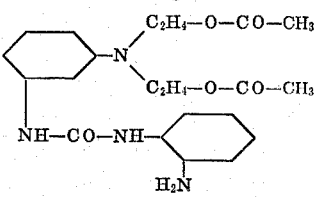

By using N-β-hydroxyethyl-N-ethylaniline and 3-nitrophenylisocyanate as starting materials, the coupling component of the formula

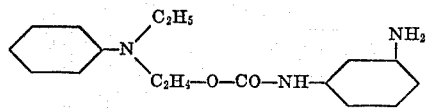

is obtained.

The addition of 1 mol of acrylonitrile gives the coupling component of the formula

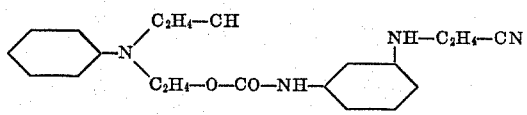

Procedure VIII (A) Preparation of the bis-nitro compound: 33.6 parts of 4-amino-2-nitroanisole are suspended in 100 parts by volume of chlorobenzene, and then 32.8 parts of 3-nitrophenylisocyanate are slowly added. A further 200 parts by volume of chlorobenzene are added, the mixture is heated to 70 to 75° C. and then stirred overnight at that temperature. The reaction mixture is cooled, the precipitate is isolated by filtration and then washed with a small amount of ethanol. The precipitate is dried in vacuo and a product of the formula

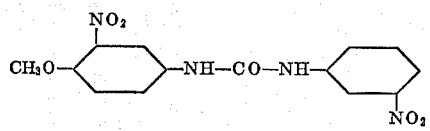

is obtained.

(B) Preparation of the bis-amine: 56 parts of 3,3'-dinitro-4-methoxydiphenylurea are hydrogenated in 200 parts by volume of dimethylformamide in the presence of Raney-nickel as catalyst. The catalyst is removed by filtration, the solution is added to an excess of iced water while stirring, the precipitate is isolated by filtration and then washed well with water. The precipitate is dried in vacuo and a product of the formula

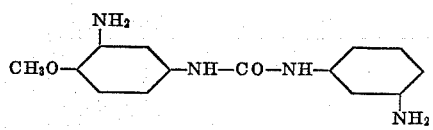

is obtained.

The product of the formula

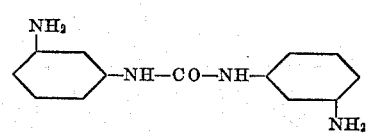

may be obtained in an analogous manner by reacting meta-nitroaniline with meta-nitrophenylisocyanate and then reducing.

Use of the corresponding para-methoxy derivatives gives the coupling component of the formula

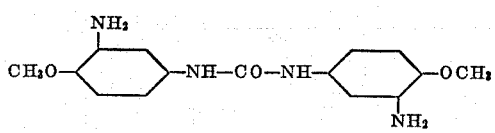

Procedure IX (A) Preparation of the chloroformic acid ester of N-β-hydroxyethyl-N-β-cyanoethylaniline: 100 parts by volume of chlorobenzene are saturated at 0 to 10° C. with phosgene. 19 parts of N-β-cyanoethyl-N-β-hydroxyethylaniline in 50 parts by volume of chlorobenzene are then added at the same temperature. A further 50 parts by volume of chlorobenzene are added, the batch is allowed to rise to room temperature while continuously introducing phosgene, heated for 2 hours at 50° C. and then heated to 80 to 85° C. Phosgene is introduced at that temperature while stirring until a clear solution forms. The batch is then stirred for a few hours at the same temperature, whereupon the excess of phosgene is expelled with nitrogen. The hot solution is filtered with the exclusion of moisture, the solvent is removed in vacuo, the residue, which solidifies after some time, is triturated well with chloroform and then dried in vacuo. A product of the formula

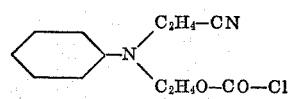

is obtained, which must be protected from moisture until used.

According to the infra-red spectrum the compound is an amide in the solid state; however, in the reaction described below it behaves as a chloroformic acid ester.

(B) Preparation of the bifunctional coupling component: 14 parts of N-bis-β-acetoxyethyl-3-aminoaniline are dissolved in 25 parts by volume of toluene and 4.5 parts by volume of pyridine. 12.7 parts of the chloroformic acid ester of N-β-cyanoethyl-N-β-hydroxyethylaniline are added slowly at a temperature of 20 to 30° C., 25 parts by volume of toluene are added, and the batch is stirred overnight at room temperature. The mixture is then heated for 2 hours, the solvent is removed in vacuo, and the residue is dissolved in chloroform. This solution is first extracted with 2 N hydrochloric acid and then with 10% sodium hydroxide solution, washed until the washings run neutral and then dried over anhydrous calcium sulphate. The solvent is removed and a product of the formula

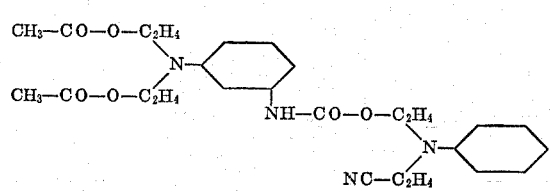

is obtained.

The bifunctional coupling component of the formula

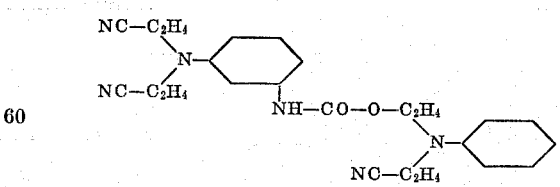

may be obtained in an analogous manner by using 3-N,N-di(β-cyanoethyl)-aminoaniline as starting material.

Example 1

1.22 parts of the diamine obtained in accordance with Procedure IB are dissolved in 50 parts of 2 N hydrochloric acid and the solution is poured on to a mixture of 200 parts of ice and 50 parts of glacial acetic acid. A solution of 1.63 parts of 2-cyano-4-nitroaniline in 10 parts of N-nitrosylsulphuric acid is added at 0° C. while stirring, the batch is stirred for 2 hours at 0° C., the product that precipitates is isolated by suction filtration, washed with water until the washings run neutral and then dried. The product oft he formula

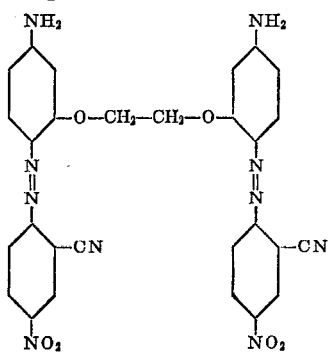

is a dark powder that dyes polyester fibres a red shade possessing excellent fastness to light and sublimation.

Dyeing procedure: 1 part of the dyestuff obtained in the manner described in Example 1 is ground wet with 2 parts of a 50% aqueous solution of the sodium salt of dinaphthylmethane disulphonic acid, and the batch is dried.

The dyestuff preparation so obtained is mixed with 40 parts of a 10% aqueous solution of the sodium salt of N-benzyl-μ-heptadecyl-benzimidazoledisulphonic acid and then 4 parts of a 40% acetic acid solution are added. A dyebath of 4,000 parts is prepared therefrom by dilution with water.

100 parts of a cleaned polyester fibre material are entered into this dyebath at 50° C., the temperature is raised to 120 to 130° C. within half an hour and dyeing is carried out for one hour at that temperature in a closed vessel. The material is then well rinsed. A strong red dyeing possessing excellent fastness to light and sublimation is obtained.

Example 2

By coupling the diamine obtained in accordance with Procedure IIB with diazotized 2-cyano-4-nitroaniline in the manner described in Example 1, the dyestuff of the formula

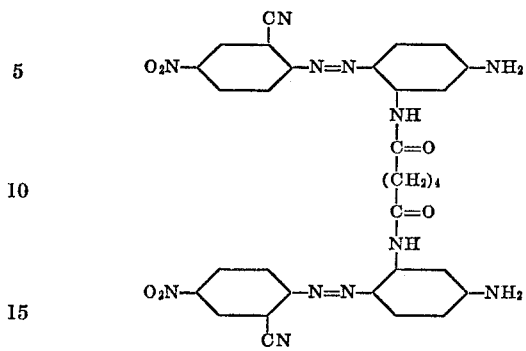

is obtained which dyes polyester fibres a red shade possessing excellent properties of fastness.

Example 3

By using diazotized 4-nitroaniline and otherwise proceeding in the manner described in Example 2, the dyestuff of the formula

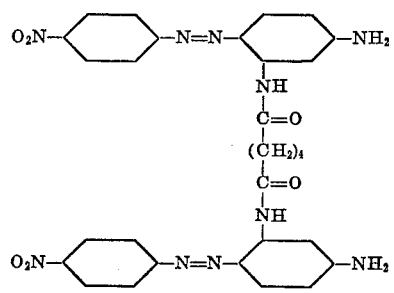

is obtained which dyes polyester fibres an orange shade.

Dyestuffs which dye polyester fibres the shades listed in column III of the following table may be obtained by coupling the diazotized diazo components listed in column I with the coupling components shown in column II.

| Example number | I | II | III |
|---|---|---|---|
| 4 | $O_2N-\langle\rangle(Cl)-NH_2$ | $[\langle\rangle-N(C_2H_4-CN)(NH-CO-CH_2-)]_2$ | Red. |
| 5 | $O_2N-\langle\rangle-NH_2$ | Same as above | Orange. |
| 6 | $O_2N-\langle\rangle(CN)-NH_2$ | ...do... | Ruby. |
| 7 | $C_2H_5O-\langle\rangle[N,S]C-NH_2$ (benzothiazole) | ...do... | Red. |
| 8 | $CH_3-\overset{+}{N}(CH_3)(CH_3)-CH_2-CO-\langle\rangle-NH_2 \; Cl^{\ominus}$ | ...do... | Orange. (dyeing on polyacrylonitrile). |
| 9 | $C_2H_5O-\langle\rangle[N,S]C-NH_2$ (benzothiazole) | $[\langle\rangle-N(H)(C_2H_4-CN)(NH-CO-CH_2-CH_2-)]_2$ | Red. |
| 10 | $C_6H_5-C[N,N,S]C-NH_2$ (thiadiazole) | Same as above | Orange-red. |

| Example number | I | II | III |
|---|---|---|---|
| 11 | $O_2N$—⬡(CN)—$NH_2$ | ......do...... | Ruby. |
| 12 | Same as above | [⬡—N(C_2H_4—O—CO—CH_3)(C_2H_4—O—CO—CH_3) / NH—]_2  —CO—C(=CH—CH=)S(=C)—CO— | Violet. |
| 13 | Cl⊖ (CH_3)_3N⊕—CH_2—CO—⬡—$NH_2$ | Same as above | Brown-orange (dyeing on polyacrylonitrile and on untanned cotton). |
| 14 | $O_2N$—⬡(Cl)—$NH_2$ | ......do...... | Red. |
| 15 | $O_2N$—⬡(Cl)(Cl)—$NH_2$ | ......do...... | Reddish-violet. |
| 16 | $O_2N$—⬡—$NH_2$ | ......do...... | Orange. |
| 17 | $O_2N$—⬡(CN)—$NH_2$ | [⬡—N(C_2H_4—O—CO—CH_3)(C_2H_4—O—CO—CH_3) / NH—CO—CH_2—CH_2—]_2 | Violet. |
| 18 | $O_2N$—⬡—$NH_2$ | Same as above | Orange. |
| 19 | $O_2N$—⬡(Cl)—$NH_2$ | [⬡—N(C_2H_4—CN)(C_2H_4—CN) / NH—CO—CH_2—]_2 | Red. |
| 20 | $CH_3O_2S$—⬡(Cl)—$NH_2$ | [⬡—N(C_2H_4—CN)(C_2H_4—CN) / NH—]_2  —CO—C(=)S(=)C—CO— | Red. |
| 21 | $O_2N$—⬡(Cl)(Cl)—$NH_2$ | [⬡—N(C_2H_4—CN)(C_2H_4—CN) / NH—CO—CH_2—CH_2—]_2 | Claret. |
| 22 | $O_2N$—⬡—$NH_2$ | [⬡—N(C_2H_4—CN)(C_2H_4—CN) / NH—]_2  —CO—C(=)O(=)C—CO— | Orange. |
| 23 | $O_2N$—⬡(CN)—$NH_2$ | [⬡—$NH_2$ / NH—CO—NH—CH_2—]_2 | Red. |
| 24 | Same as above | [⬡—$NH_2$ / NH—CO—NH—CH_2—]_2 | Yellow. |
| 25 | $O_2N$—⬡(CN)—$NH_2$ | [⬡—$NH_2$ / NH—CO—O—CH_2—]_2 | Orange-yellow. |

| Example number | I | II | III |
|---|---|---|---|
| 26 | Cl, O₂N–⬡–NH₂ | [⬡–N(C₂H₄–O–CO–CH₃)(C₂H₄–O–CO–CH₃), NH–CO–NH–(CH₂)₃–]₂ | Red. |
| 27 | CN, O₂N–⬡–NH₂ | Same as above | Violet. |
| 28 | Same as above | [⬡(–NH₂)(O–CH₂–)]₂ | Red. |
| 29 | Cl, O₂N–⬡–NH₂ | [⬡(–OCH₃)(–N(H)(C₂H₄–CN))(NH–CO–CH₂–)]₂ | Red. |
| 30 | O₂N–⬡–NH₂ | Same as above | Reddish orange. |
| 31 | Cl, CH₃O₂S–⬡–NH₂ | do | Orange-red. |
| 32 | CN, O₂N–⬡–NH₂ | do | Reddish-blue. |
| 33 | Cl, O₂N–⬡(Cl)–NH₂ | [⬡(–OCH₃)(–NH₂)(NH–CO–CH₂–)]₂ | Violet. |
| 34 | CN, O₂N–⬡–NH₂ | Same as above | Reddish-blue. |
| 35 | Cl, O₂N–⬡–NH₂ | [⬡(–CH₃)(–NH₂)(NH–CO–CH₂–CH₂–)]₂ | Red. |
| 36 | CN, O₂N–⬡–NH₂ | Same as above | Ruby. |
| 37 | Cl, CH₃O₂S–⬡–NH₂ | CH₃O–⬡(–NH₂)–NH–CO–NH–⬡–NH₂ | Scarlet. |
| 38 | CN, O₂N–⬡–NH₂ | Same as above | Violet. |
| 39 | Cl, O₂N–⬡–NH₂ | do | Red. |
| 40 | CN, O₂N–⬡–NH₂ | [⬡(–NH₂)(NH–CO–O–CH₂–)]₂ | Red. |

| Example number | I | II | III |
|---|---|---|---|
| 41 | 2-amino-5-nitrobenzonitrile | N,N-bis(2-acetoxyethyl)-N'-(3-aminophenyl)-phenylenediamine with urea linkage | Violet. |
| 42 | 2-amino-1,3-dichloro-4-nitrobenzene | N-(2-cyanoethyl)-N-(2-carbamoyloxyethyl)-3-aminoaniline | Yellowish brown. |
| 43 | 2-amino-4-nitrochlorobenzene | Same as above | Violet. |
| 44 | 2-amino-5-nitrochlorobenzene | ...do... | Red. |
| 45 | 2-amino-3-chloro-5-methylsulfonyl | ...do... | Red. |
| 46 | 2-amino-5-nitrobenzonitrile | N,N-bis(2-cyanoethyl)-... with carbamate linkage to N-H-N-(2-cyanoethyl) | Ruby. |
| 47 | 2-amino-4-nitrochlorobenzene | Same as above | Scarlet. |
| 48 | 2-amino-5-nitrobenzonitrile | Bis[N,N-bis(2-acetoxyethyl)] with carbamate/cyanoethyl | Claret. |
| 49 | 2-amino-6-ethoxybenzothiazole | Bis[N,N-bis(2-acetoxyethyl)] with carbamate | Red. |
| 50 | 3-methyl-6-ethoxy-2-aminobenzothiazolium chloride | Same as above | Blue (dyeing on polyacrylonitrile). |
| 51 | 2-amino-5-nitrobenzonitrile | N-(2-cyanoethyl)-N-(2-carbamoyloxyethyl) with N,N-bis(2-cyanoethyl) | Ruby. |
| 52 | 2-amino-4-nitrochlorobenzene | Same as above | Red. |
| 53 | 4-nitroaniline | ...do... | Orange. |

| Example number | I | II | III |
|---|---|---|---|
| 54 | 6-methyl-benzothiazol-2-yl-amine | [cyclohexane with N(C2H4CN)(H) and NH-CO-CH3]2 | Red. |
| 55 | 6-methoxy-benzothiazol-2-yl-amine | [cyclohexane with N(C2H4CN)(H) and NH-CO-CH2-CH3]2 | Red. |
| 56 | 6-H2NO2S-benzothiazol-2-yl-amine | [cyclohexane with N(C2H4-O-CO-CH3)2 and NH-]2 linked by thiophene-2,5-dicarbonyl | Bluish red. |
| 57 | 6-NC-benzothiazol-2-yl-amine | [cyclohexane with N(C2H4CN)2 and NH-]2 linked by pyridine-2,6-dicarbonyl | Red. |
| 58 | 6-O2N-benzothiazol-2-yl-amine | [cyclohexane with NH2 and NH-CO-NH-CH2-]2 | Red. |
| 59 | 4-Br, 6-O2N benzoisothiazol-3-yl-amine | [cyclohexane with N(C2H4-O-CO-CH3)2 and NH-CO-NH-(CH2)6-]2 | Blue. |
| 60 | 5-Br, 7-Br benzoisothiazol-3-yl-amine | [cyclohexane with OCH3, N(H)(C2H4CN), NH-CO-CH3]2 | Do. |
| 61 | 5-Cl, 7-Br benzoisothiazol-3-yl-amine | [cyclohexane with OCH3, NH2, NH-CO-CH2-]2 | Do. |
| 62 | benzoxazol-2-yl-amine | CH3O-cyclohexane(NH2)-NH-CO-NH-cyclohexane-NH2 | Red. |
| 63 | 5-O2N-thiazol-2-yl-amine | [cyclohexane with NH2 and NH-CO-O-CH2-]2 | Violet. |
| 64 | 6-(CH3-CO-NH)-benzothiazol-2-yl-amine | [cyclohexane with N(C2H4-O-CO-C2H5)2 and NH-CO-CH3]2 | Bluish-red. |

| Example number | I | II | III |
|---|---|---|---|
| 65 | 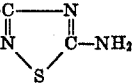 | 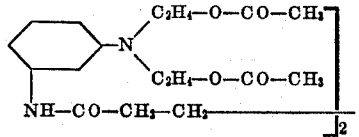 | Red. |
| 66 | 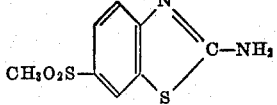 | 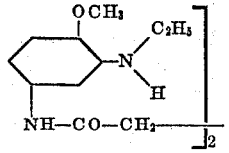 | Red-violet. |
| 67 | 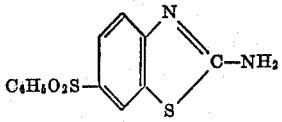 | 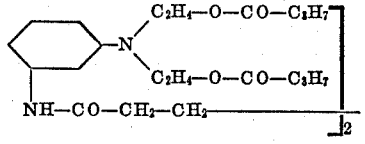 | Blush-red. |
| 68 | 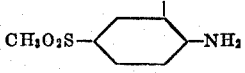 | 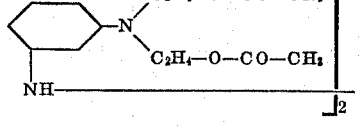 | Scarlet. |
| 69 | 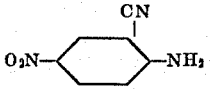 | 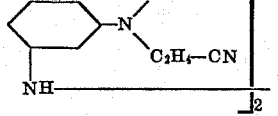 | Ruby. |

Example 70

10.5 parts of the dyestuff of the formula

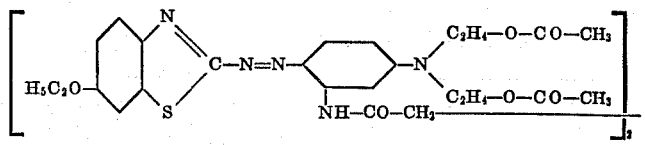

(obtained by coupling diazotized 6-ethoxybenzothiazole with succinic acid-N-m-(N',N'-di(acetoxyethyl)amino)-phenylamide) were heated in 150 parts dimethylformamide at 80° C. and treated with a little more than the equivalent amount of dimethylsulfate. The hot mixture is stirred some hours and then the dyestuff formed is precipitated by addition of ethyl acetate. For further purification the dyestuff is dissolved in hot water, precipitated with sodium chloride, filtered off and dried to give the product of the formula

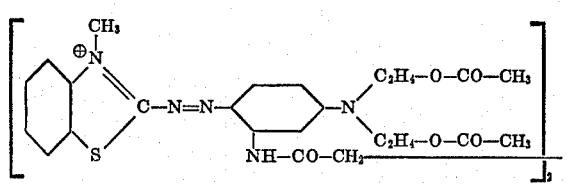

which dyes acrylic fibers in blue shades.

The same product was obtained if 4.5 parts of 2-hydrazino-3-methyl-6-ethoxy-2,3 - dihydro-benzothiazole and 6 parts of the coupling component of the formula

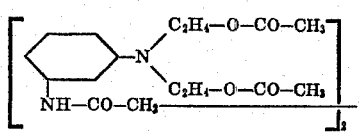

were treated in 150 parts dimethylformamide slowly with an iron-(III)-chloride solution.

Analogous dyestuffs are obtained if the coupling components listed in column II of the following table are coupled with the diazonium compounds of the diazo components listed in column I and then are treated with dimethylsulfate. They dye acrylic fibers in the shades listed in column III.

| Example number | I | II | III |
| --- | --- | --- | --- |
| 71 | | | Blue. |
| 72 | | | Do. |
| 73 | | | Do. |
| 74 | | | Blue-green. |
| 75 | | | Bluish-red. |
| 76 | | | Greenish-blue. |
| 77 | | | Blue. |

Example 78

Continuous dyeing of polyester fabrics: 20 parts of the dyestuff of the formula

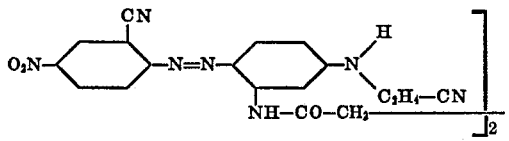

are ground with 140 parts of water containing 40 parts of the sodium salt of dinaphthylmethane disulphonic acid.

A padding liquor is prepared from 200 parts of the above dyestuff preparation, 100 parts of carboxymethylcellulose (4% aqueous solution) and 700 parts of water whereby the said dyestuff preparation is mixed with the prediluted thickener by means of a high-speed stirrer, and the pH of the mixture is subsequently adjusted to 6 by the addition of 80% acetic acid. A polyester fiber fabric is padded with this liquor at 30° C., the nip being adjusted to give 60% liquor pick-up, and then dried at 70 to 80° C. The fabric is then heated on a stenter for 60 seconds at 210° C., washed hot, and then well rinsed with cold water. The fabric is dyed a violet shade possessing good properties of fastness.

Example 79

1 part of the dyestuff of the formula

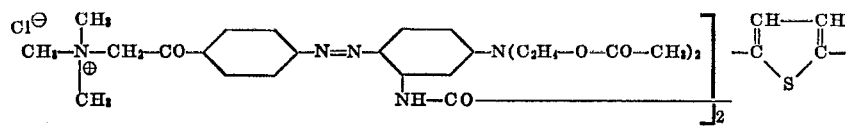

is dissolved in 5,000 parts of water in the presence of 2 parts of 40% acetic acid. 100 parts of dried polyacrylonitrile staple fiber yarn are entered into this dyebath at 60° C., the temperature is raised to 100° C. within half an hour, and dyeing is carried out for one hour at the boil. An orange dyeing possessing very good fastness to light, sublimation and washing is obtained.

What is claimed is:

1. A diazo compound of the formula

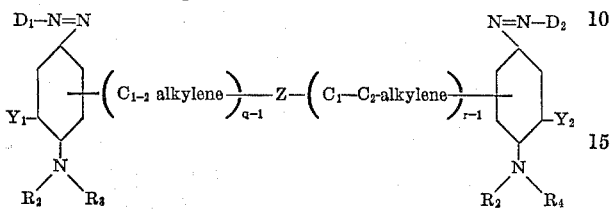

wherein $D_1$ and $D_2$ is thiazolyl, pyridyl, quinolyl, pyrazolyl, indazolyl, triazolyl, benzthiazolyl, thiadiazolyl, thienyl, phthalimidyl, thiazolyl substituted by nitro,, methylsulfonyl, cyano, methyl, nitro or chlorophenyl, pyrazolyl substituted by phenyl or methoxyphenyl, triazolyl substituted by methyl, ethyl, phenyl or benzyl, benzthiazolyl substituted by methyl, methoxy, chloro, cyano, thiocyano, nitro, carbethoxy or methylsulfonyl, thiadiazolyl substituted by methyl or phenyl, thienyl substituted by nitro or methylsulfonyl, isothiazolyl substituted by methyl, or pyrazolyl substituted by cyano or nitrophenyl; $R_1$, $R_2$, $R_3$ and $R_4$ each is hydrogen, $C_1$-$C_{12}$-alkyl or $C_1$-$C_{12}$-alkyl substituted by chlorine, bromine, cyano, $C_1$-$C_{12}$-alkoxy, hydroxy, $C_1$-$C_4$-alkanoyloxy, $C_1$-$C_4$-alkanoylamino, $C_1$-$C_4$-alkoxycarbonyloxy and $C_1$-$C_4$-alkylcarbamoyloxy, $q$ and $r$ each is 1 or 2, $Y_1$ and $Y_2$ each is hydrogen, methyl, methoxy, ethyl and ethoxy, and Z is

—NH—CO—Z'—CO—NH— in which Z' is

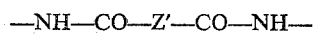

2. The dyestuff of claim 1 wherein Z' is phenylene.

3. Disazo compounds as claimed in claim 1, wherein either $D_1$ or $D_2$ or both contain a

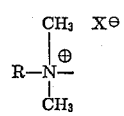

group or a

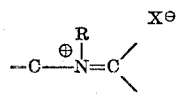

group wherein R is lower alkyl or phenyl and X is an anion.

4. A dyestuff according to claim 1 of the formula

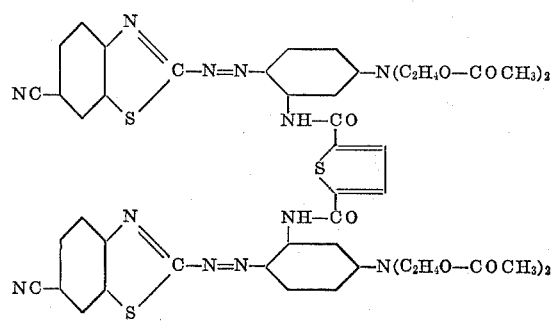

5. A dyestuff according to claim 1 of the formula

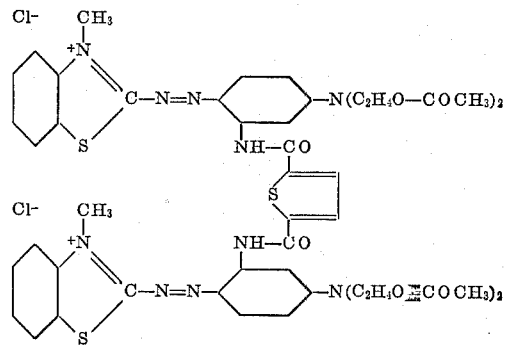

References Cited
UNITED STATES PATENTS

| | | | |
|---|---|---|---|
| 2,813,856 | 11/1957 | Steingmann et al. | 260—174 |
| 2,875,193 | 2/1959 | Riat | 260—158 |
| 3,232,928 | 2/1966 | Baumann et al. | 260—175 |
| 3,271,383 | 9/1966 | Yamaya et al. | 260—158 |
| 3,415,808 | 12/1968 | Weber et al. | 260—158 |
| 3,443,952 | 5/1969 | Anderau | 260—152 X |

FLOYD D. HIGEL, Primary Examiner

U.S. Cl. X.R.

8—41 C; 260—152, 155, 156, 157, 178, 184, 332.2 C 456 A, 463, 465 D, 465 E, 472, 475 PN, 479 C, 485 J, 490, 553 AC, 556 B, 556 S, 562 R, 562 A, 571, 576, 578, 613 R